(12) United States Patent
Dong et al.

(10) Patent No.: US 12,719,305 B1
(45) Date of Patent: Aug. 25, 2026

(54) COMBINED FAULT CURRENT LIMITING AND DIRECT INRUSH RESTRAINT ALGORITHMS FOR IMPROVED TRANSFER WITH STATIC TRANSFER SWITCHES

(71) Applicant: ABB SCHWEIZ AG, Baden (CH)

(72) Inventors: Zhou Dong, Cary, NC (US); Govind Chavan, Garner, NC (US); Harish Suryanarayana, Apex, NC (US); Shuyan Zhao, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 19/221,843

(22) Filed: May 29, 2025

(51) Int. Cl.
*H02J 9/06* (2006.01)
*H02J 3/001* (2026.01)

(52) U.S. Cl.
CPC .............. *H02J 9/062* (2013.01); *H02J 3/001* (2020.01)

(58) Field of Classification Search
CPC .................................. H02J 9/062; H02J 3/001
USPC ............................................................ 307/52
See application file for complete search history.

(56) References Cited

U.S. PATENT DOCUMENTS

| | | | | |
|---|---|---|---|---|
| 12,470,086 B2 * | 11/2025 | Chen | ........................ | H02J 9/068 |
| 2014/0132080 A1 * | 5/2014 | Bush | ........................ | H03K 17/94 307/130 |
| 2017/0126006 A1 * | 5/2017 | Pfitzer | ........................ | H02J 3/007 |
| 2024/0030741 A1 * | 1/2024 | Bose | ........................ | H02J 9/068 |

* cited by examiner

*Primary Examiner* — Michael R. Fin
(74) *Attorney, Agent, or Firm* — Greenberg Traurig, LLP

(57) ABSTRACT

Systems and methods for transferring a load between power sources may include monitoring voltage waveforms of power sources, in response to a power quality event affecting a first power source, switching a first switch device off to disconnect the load from the first power source, calculating a phase angle difference between the power sources based on the monitored voltage waveforms, selecting one of a first and second algorithms for transferring the load to a second power source based on the phase angle, selectively switching a second switch device using the selected one of the first algorithm and the second algorithm to transfer the load to the second power source. A controller may select the one of the first algorithm and the second algorithm based on the phase angle and a metric of the load transfer associated with the algorithms.

20 Claims, 11 Drawing Sheets

COMBINED FAULT CURRENT LIMITING AND DIRECT INRUSH RESTRAINT ALGORITHMS FOR IMPROVED TRANSFER WITH STATIC TRANSFER SWITCHES

FIELD

This disclosure relates to the field of switching devices. More particularly, this disclosure relates to a switching device that provides combined fault current limiting and direct inrush restraint algorithms for improved transfer with static transfer switches.

BACKGROUND

Static Transfer Switches (STS) are essential components to ensure seamless power transfer between two independent sources without interrupting power to a connected load in electrical power systems. STS are routinely used in critical applications like data centers, hospitals, and industrial facilities to continuously maintain supply of power to the load and to protect the load devices from electrical faults. When electrical fault events occur at the power source that is connected to the load, the STS can transfer the load from the faulty power source to the other power source to continuously maintain supply of power to the load. However, there can be delay spanning from the time the STS disconnects the load from the faulty power source to the time the STS connects the load to the other power source according to a design of the STS and the techniques used to control the STS during the transfer. This delay, in cases where the system includes a load transformer, can be from matching the phase of the input power source with the flux of the downstream transformer to avoid transformer saturation. Accordingly, improved STSs designed to reduce delay times during the transfer process are desirable.

SUMMARY

In some embodiments, a method includes monitoring, with a controller associated with a static transfer switch of an AC distribution system, a first voltage waveform of a first power source connectable to a load by a first solid-state switch device of the static transfer switch and a second voltage waveform of a second power source connectable to the load by a second solid-state switch device of the static transfer switch, in response to detecting a power quality event affecting the first power source, switching, with the controller, the first solid-state switch device off to disconnect the load from the first power source, calculating, with the controller, a first value corresponding to a phase angle difference between the first power source and the second power source based on the monitored voltage waveforms, selecting, with the controller, one of a first algorithm and a second algorithm for transferring the load to the second power source from the first power source based on the first value, and selectively switching, with the controller, the second solid-state switch device using the selected one of the first algorithm and the second algorithm to transfer the load to the second power source. In some embodiments, the controller is configured to select the one of the first algorithm and the second algorithm based on the calculated first value and according to a metric of the load transfer associated with the first algorithm and the second algorithm.

In some embodiments, the method further includes calculating, with the controller, a second value corresponding to a starting angle for transferring the load to the second power source from the first power source. In some embodiments, the controller is configured to select the one of the first algorithm and the second algorithm based on the calculated first value and the calculated second value and according to the metric of the load transfer associated with the first algorithm and the second algorithm. In some embodiments, the metric includes the one of the first algorithm and the second algorithm having a lowest transfer time for transferring the load to the second power source relative the other of the first algorithm and the second algorithm based on the calculated first value and the calculated second value.

In some embodiments, selectively switching the second solid-state switch device using the first algorithm includes calculating, with the controller, a third value corresponding to a flux at a load transformer, and in response to the flux at the load transformer matching a flux at the second solid-state switch device, switching, with the controller, the second solid-state switch device on to transfer the load to the second power source. In some embodiments, the third value is based on a flux of the first power source when the first solid-state switch device is switched off to disconnect the load from the first power source.

In some embodiments, selectively switching the second solid-state switch device using the second algorithm includes monitoring, with the controller, an electric current at the second solid-state switch device, calculating, with the controller, a current limiting range for selectively switching the second solid-state switch device using the second algorithm based on the electric current at the second solid-state switch device, and selectively switching, with the controller, the second solid-state switch device on and off to transfer the load to the second power source according to the current limiting range. In some embodiments, the current limiting range includes an upper limit value and a lower limit value relative to a nominal current of the second solid-state switch device. In some embodiments, the current limiting range is configured to maintain the electric current at the second solid-state switch device below an inrush current threshold.

In some embodiments, selectively switching the second solid-state switch device on and off to transfer the load to the second power source according to the current limiting range includes in response to the monitored electric current falling under the lower limit value, switching, with the controller, the second solid-state switch device on and connecting the load to the second power source, and in response to the monitored electric current exceeding the upper limit value, switching, with the controller, the second solid-state switch device off and disconnecting the load to the second power source. In some embodiments, the controller is configured to selectively switch the second solid-state switch device on and off to maintain the electric current at a defined trajectory to reduce a total harmonic distortion when transferring the load to the second power source.

In some embodiments, the method further includes monitoring, with the controller, a time period for transferring the load from the first power source to the second power source using the second solid-state switch device, and in response to the time period exceeding a time limit, switching, with the controller, the second solid-state switch device off to disconnect the load from the second power source. In some embodiments, exceeding the time limit for transferring the load from the first power source to the second power source is indicative of a downstream fault.

In some embodiments, the time limit may be based on a capacity of energy storage devices at the load. In some embodiments, the energy storage devices may be configured to maintain a continuous supply of power to the load during the transfer.

In some embodiments, the AC distribution system includes at least one phase. In some embodiments, the static transfer switch is configured to connect the load to the one of the first power source and the second power source on the at least one phase using one of the first algorithm or the second algorithm.

In some embodiments, in response to selecting the first algorithm, the controller is configured to switch on the second solid-state switch device at the at least one phase to transfer the load to the second power source at an instant a flux at a load transformer matches a flux at the second power source. In some embodiments, in response to selecting the second algorithm, the controller is configured to selectively switch on and off the second solid-state switch device at the at least one phase according to a current limiting range until the flux at the load transformer matches the flux at the second power source to transfer the load to the second power source.

In some embodiments, the AC distribution system includes a plurality of phases. In some embodiments, the static transfer switch is configured to connect the load to the one of the first power source and the second power source on each of the plurality of phases.

In some embodiments, the metric includes at least one of a transfer time of the first algorithm and the second algorithm, a harmonic distortion during the transfer using the first algorithm and the second algorithm, or a minimum number of switching actions during the transfer using the first algorithm and the second algorithm.

In some embodiments, a system includes a static transfer switch. In some embodiments, at least one phase of the static transfer switch includes a first solid-state switch device selectively operable to connect a load to a first power source, a second solid-state switch device selectively operable to connect the load to a second power source, and a control circuit associated with the static transfer switch. In some embodiments, the control circuit is configured to perform operations including monitor a first voltage waveform of the first power source and a second voltage waveform of the second power source, in response to detecting a power quality event affecting the first power source, switch the first solid-state switch device off to disconnect the load from the first power source, calculate a first value corresponding to a phase angle difference between the first power source and the second power source based on the monitored voltage waveforms, calculate a second value corresponding to a starting angle for transferring the load to the second power source from the first power source, select one of a first algorithm and a second algorithm for transferring the load to the second power source from the first power source based on the first value and the second value, and selectively switch the second solid-state switch device using the selected one of the first algorithm and the second algorithm to transfer the load to the second power source. In some embodiments, the control circuit is configured to select the one of the first algorithm and the second algorithm based on the first value and the second value and according to a metric of the load transfer associated with the first algorithm and the second algorithm.

In some embodiments, selectively switching the second solid-state switch device using the first algorithm includes calculate a third value corresponding to a flux at a load transformer, and in response to the flux at the load transformer matching a flux at the second solid-state switch device, switching, with the control circuit, the second solid-state switch device on to transfer the load to the second power source. In some embodiments, the third value is based on a flux of the first power source when the first solid-state switch device is switched off to disconnect the load from the first power source.

In some embodiments, selectively switching the second solid-state switch device using the second algorithm includes monitor an electric current at the second solid-state switch device, calculate a current limiting range for the second solid-state switch device based on the electric current at the second solid-state switch device, in response to the electric current at the second solid-state switch device exceeding a lower limit value of the current limiting range, switch the second solid-state switch device on, and in response to the electric current at the second solid-state switch device exceeding an upper limit value of the current limiting range, switch the second solid-state switch device off. In some embodiments, the current limiting range includes the upper limit value and the lower limit value relative a nominal current of the second solid-state switch device. In some embodiments, the current limiting range is configured to maintain the electric current at the second solid-state switch device below an inrush current threshold.

In some embodiments, the control circuit is configured to selectively switch the second solid-state switch device on and off to maintain the electric current at a defined trajectory to reduce a total harmonic distortion when transferring the load to the second power source.

In some embodiments, the operations further includes monitor a time period for transferring the load from the first power source to the second power source using the second solid-state switch device based on the second algorithm, and in response to the time period exceeding a time limit, switching, with the controller, the second solid-state switch device off to disconnect the load from the second power source. In some embodiments, exceeding the time limit for transferring the load from the first power source to the second power source is indicative of a downstream fault.

In some embodiments, the time limit is based on a capacity of energy storage devices connected to the load. In some embodiments, the energy storage devices are configured to maintain a continuous supply of power to the load during the transfer.

In some embodiments, in response to selecting the first algorithm, the controller is configured to switch on the second solid-state switch device to transfer the load to the second power source at an instant a flux at a load transformer matches a flux at the second power source. In some embodiments, in response to selecting the second algorithm, the controller is configured to selectively switch on and off the second solid-state switch device according to a current limiting range until the flux at the load transformer matches the flux at the second power source to transfer the load to the second power source.

In some embodiments, the system is an AC distribution system including at least one phase. In some embodiments, the static transfer switch is configured to connect the load to the one of the first power source and the second power source on the at least one phase.

In some embodiments, the metric includes at least one of a transfer time of the first algorithm and the second algorithm, a harmonic distortion during the transfer using the first algorithm and the second algorithm, or a minimum number of switching actions during the transfer using the first algorithm and the second algorithm.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure can be practiced.

DETAILED DESCRIPTION

Figure 1:
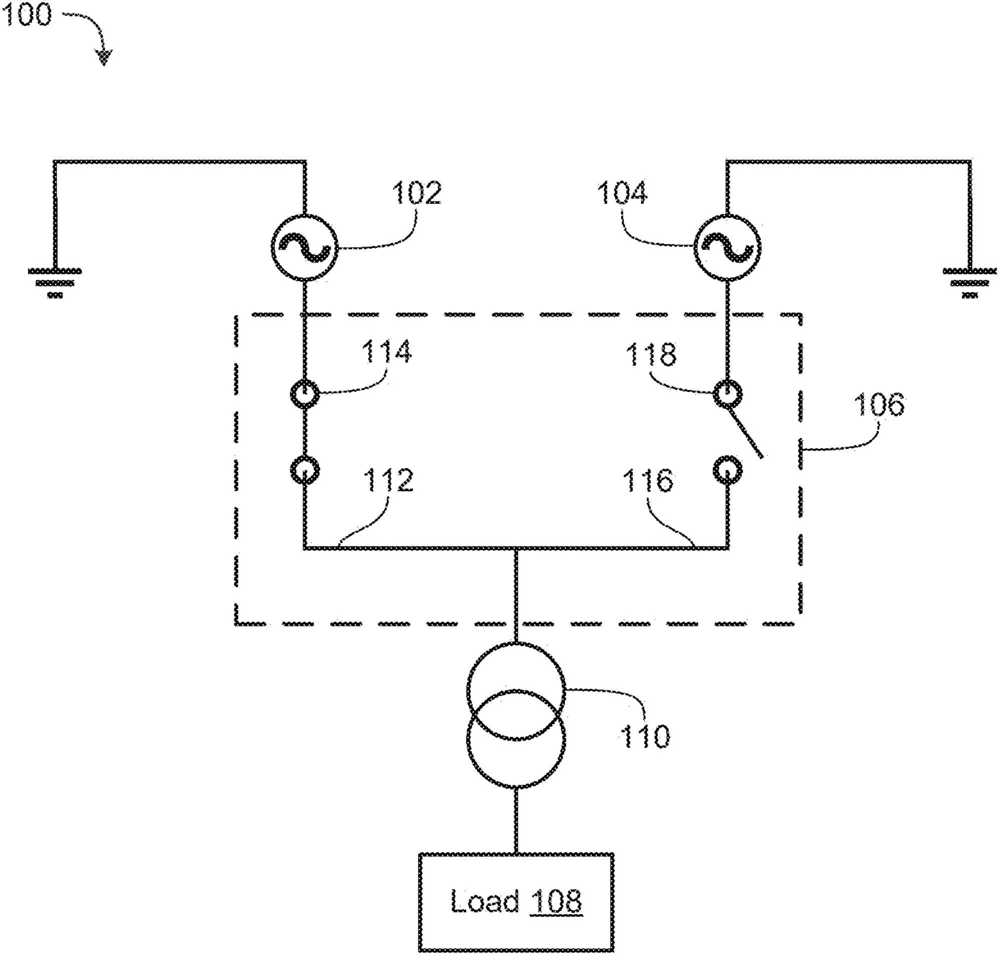
FIG. 1 is a schematic diagram of a system, according to some embodiments.

Static Transfer Switches (STSs) can be designed to ensure seamless power transfer between two independent sources such as, for example, utility power and backup generators, without interrupting a supply of electrical power to a connected load from one of the two power sources. STSs can be used to continuously maintain a supply of power to the connected load, which can include, for example and without limitation, data centers, hospitals, and industrial facilities.

Various embodiments described herein relate to systems and methods for static transfer switch control, which can, in some examples, be used to improve a transfer time for transferring a load between power sources in response to detecting a fault at the connected power source. For example, the connected power source can be a preferred power source and the other power source can be an alternate power source. The static transfer switch control can, in some embodiments, include disconnecting a load from a preferred power source using the static transfer switch responsive to detecting a power quality event (e.g., an electrical fault) at the preferred power source, calculating a phase angle difference between the two power sources based on monitored voltage waveforms of each power source, selecting one of two algorithms to transfer the load to the alternate power source, and selectively switching a respective switch device of the static transfer switch on and off using the selected algorithm to transfer (i.e., connect) the load to the second power source. In some embodiments, the one of the first algorithm and the second algorithm can be selected based on the phase angle difference between the first power source and the second power source. In some embodiments, the one of the first algorithm and the second algorithm can be selected according to a metric of each algorithm. The metric can include, in some embodiments, a transfer time of the selected algorithm, a harmonic distortion during the transfer, a number of switching actions of the selected algorithm, or any combination thereof.

The STS can continuously monitor both power sources and the STS can be used to transfer the load from one power source to the other power source based on detection of an anomaly at the connected power source such as, for example, voltage fluctuations, frequency deviations, electrical faults, combinations thereof, or the like. To transfer the load connection between power sources, the STS can select an algorithm to use to transfer the load based on a phase difference between a preferred power source and an alternate power source and a starting phase angle for the transfer to improve the transfer time for connecting the load from the preferred power source to the alternate power source. The algorithms can include, in some embodiments, a direct inrush restraint (DIR) algorithm and a fault current limiting (FCL) algorithm. The DIR algorithm can include calculating a load transformer flux when the static transfer switch disconnects the load from the preferred power source and, in response to the load transformer flux matching a flux at the switch devices of the static transfer switch used to connect to the alternate power source, operating the switch devices of the static transfer switch to connect the load to the alternate power source. The FCL algorithm can include, in some embodiments, calculating or predefining a current limiting range for the switch devices of the static transfer switch used to connect the load to the alternate power source and selectively switching the switch devices of the static transfer switch on and off to connect the load to the alternate power source in accordance with the current limiting range to maintain the electric current at the static transfer switch below a current threshold.

When utilizing a conventional STS in electrical systems, there can be a time delay between the time the STS disconnects a load from a faulty power source to the time the STS connects the load to the other power source in response to detecting an electrical fault at the power source connected to the load. This time delay can be designed to limit inrush current at the STS from transformer flux mismatch. Some conventional STS systems can utilize thyristor-based switches, which require waiting for zero-crossing of the current to turn off the thyristor-based switches, thus increasing the transfer time. The various embodiments described herein can improve upon thyristor-based switches by being able to immediately turn off the switch(es) connecting the load to the faulty power source instead of having to wait for zero-crossing of the current to disconnect the load from the faulty power source.

Some other conventional STS systems can utilize Silicon Carbide (SiC) MOSFETs, which can offer controllable turn-off capabilities for faster transfer times and improved protection coordination with downstream circuit breakers compared to thyristor-based switches. However, certain challenges remain with time delays from waiting to match transformer flux with the alternative source voltage before the alternative switch(es) can be turned on and the load can be connected to the alternative power source with conventional STS systems that use SiC MOSFETs, which can be to limit inrush current at the STS.

The various embodiments of this disclosure overcome the challenges associated with these conventional STS systems by combining fault current limiting (FCL) and direct inrush restraint (DIR) algorithms to optimize transfer performance of the STS according to phase difference and starting phase angle. The combined algorithm for providing STS control can improve transfer times between the time the load is disconnected from one power source to the time the load is connected to the other power source, thereby enhancing system reliability.

Electrical systems can include energy storage devices (e.g., capacitors) that can store electrical energy during a nominal condition. During a transfer process between power sources, the energy storage devices can be designed to supply electrical power to the load for a limited time during the transfer process based on their capacity to account for the time delay during the transfer process to continuously maintain supply of power to the load. As such, the size of the components of the energy storage devices can be selected based on, for example, their energy storage capacity, efficiency, an amount of time the energy storage devices can supply power to the load to prevent power loss during the transfer process, among other factors. By improving a transfer time for switching between power sources, the combined algorithm for STS control described herein can enable systems and facilities implementing such systems to be designed to include energy storage devices with reduced energy storage capacity because of the improved efficiency in the transfer process and from the improved time delay from transferring the load between power sources as compared to conventional STS systems, thereby reducing a total amount of time that such energy storage devices would need to supply power to the load during the transfer process. Reducing the size of the energy storage devices can also improve space requirements of the system and can reduce the overall cost of the system. In contrast, conventional STS systems have to use relatively larger energy storage devices because they demonstrate longer time delays from the transfer process and may need to be able to power the load for longer time periods based on the system conditions at the time of the transfer.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that can be embodied in various forms. In addition, each of the examples given regarding the various embodiments of the disclosure which are intended to be illustrative, and not restrictive.

FIG. 1 is a schematic diagram of a system 100, according to some embodiments. The system 100 can be an alternating current (AC) electrical system. The system 100 can include a first power source 102, a second power source 104, a static transfer switch 106, and a load 108. The first power source 102 can in some embodiments be a preferred power source. For example, the first power source 102 can include a utility grid. The second power source 104 can in some embodiments be a secondary power source. For example, the second power source 104 can include at least one of a generator, batteries, solar power, combinations thereof, or some other like power source(s). It should be appreciated that the power sources can be AC power sources having one phase, three phases, or other number of phases.

The load 108 can include one or more devices that depends on continuous delivery of power from one of the first power source 102 and second power source 104. For example, the load 108 can include devices associated with a data center. In some embodiments, the system 100 can further include a load transformer 110. The load transformer 110 can be located between the static transfer switch 106 and the load 108.

The static transfer switch 106 can include a first branch 112 including a first solid-state switch device 114 and a second branch 116 including a second solid-state switch device 118. The first branch 112 can be coupled to the first power source 102 and the load 108. The second branch 116 can be coupled to the second power source 104 and the load 108. At the first branch 112, the first solid-state switch device 114 can be switched closed to connect the first power source 102 to the load 108 and the first solid-state switch device 114 can be switched open to disconnect the first power source 102 from the load 108 in accordance with a fault current limiting algorithm of the present disclosure. In addition, at the second branch 116, the second solid-state switch device 118 can be switched closed to connect the second power source 104 to the load 108 and the second solid-state switch device 118 can be switched open to connect the second power source 104 to the load 108 in accordance with the fault current limiting algorithm of the present disclosure.

First solid-state switch device 114 and second solid-state switch device 118 of static transfer switch 106 can have a fast switching frequency to transfer load 108 between first power source 102 and second power source 104 in accordance with the DIR algorithm or the FCL algorithm, as will be further described herein. First solid-state switch device 114 and second solid-state switch device 118 of static transfer switch 106 can, in some embodiments, be SiC MOSFETs. First solid-state switch device 114 and second solid-state switch device 118 of static transfer switch 106 can, in some embodiments, include a SiC metal-oxide-semiconductor field-effect-transistor (MOSFET), a SiC integrated-gate bipolar transistor (IGBT), an integrated gate-commutated thyristor (IGCT), other similar switch devices capable of high frequency switching, or any combination thereof. In other embodiments, first solid-state switch device 114 and second solid-state switch device 118 of static transfer switch 106 can be other types of switch devices capable of fast frequency switching operations in accordance with the DIR algorithm or the FCL algorithm described herein.

In one example, during a nominal condition, the first solid-state switch device 114 can be switched into the closed position such that the static transfer switch 106 connects the load 108 to the first power source 102. Responsive to detecting an electrical fault at the first power source 102, the first solid-state switch device 114 can be switched open such that the static transfer switch 106 disconnects the load 108 from the first power source 102 and the second solid-state switch device 118 can be switched closed such that the static transfer switch 106 begins transferring the load to the second power source 104 in accordance with the current limiting algorithm of the present disclosure. In some embodiments, the first solid-state switch device 114 can be switched open at a same instant as the electrical fault is detected at the first power source 102. In some embodiments, the second solid-state switch device 118 can be switched closed at a same instant as the first solid-state switch device 114 is switched open. In other embodiments, the second solid-state switch device 118 can be switched closed at a same instant that the current at the first solid-state switch device 114 reaches a zero threshold.

The static transfer switch 106 can include one or more solid-state switch devices. Although the static transfer switch 106 of FIG. 1 shows one solid-state switch device located on each branch, it is to be appreciated that the static transfer switch 106 can, in some embodiments, include one or more solid-state switch devices located on each branch that can be switched open and closed to connect or disconnect the load 108 to the corresponding first power source 102 and second power source 104 based on the condition of the system 100.

Figure 2:
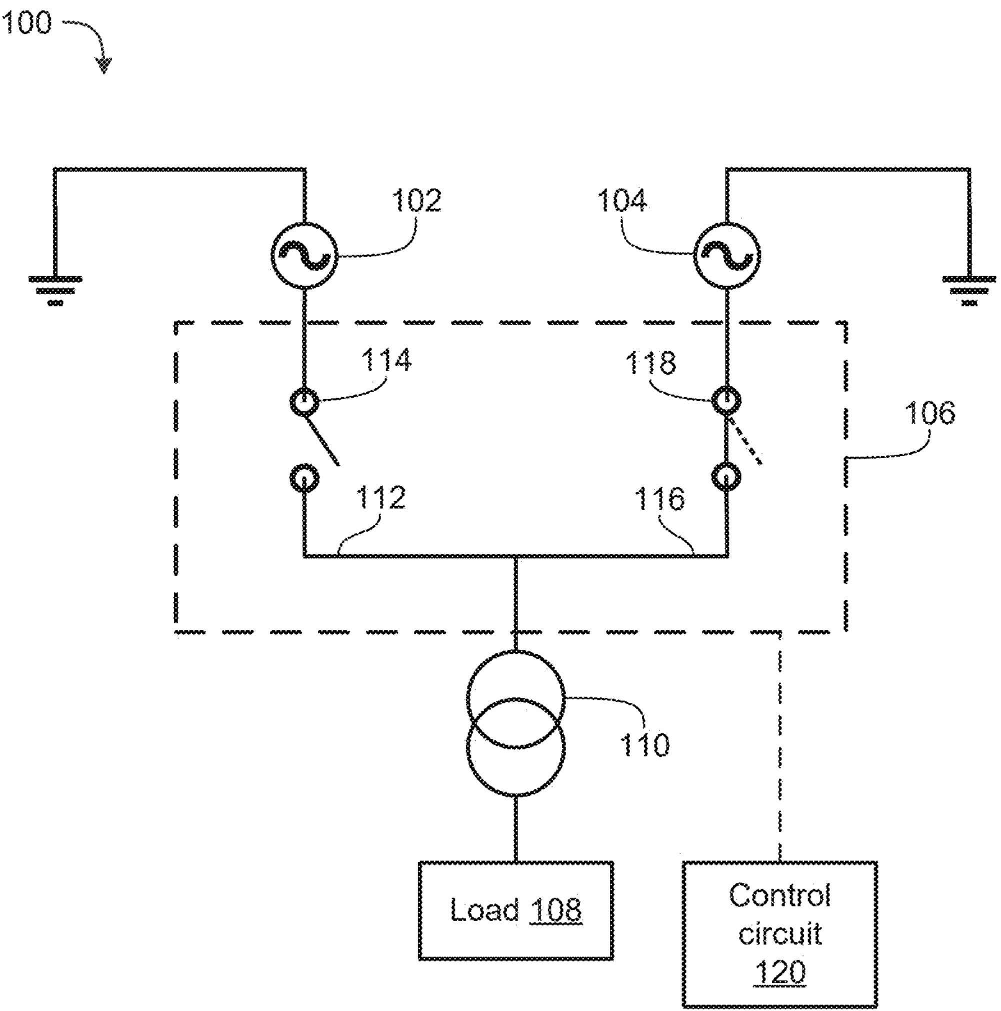
FIG. 2 is a schematic diagram of the system of FIG. 1, according to some embodiments.

FIG. 2 is a schematic diagram of the system 100, according to some embodiments. The system 100 of FIG. 2 illustrates the process of transferring the load 108 from the first power source 102 to the second power source 104 using an algorithm, in accordance with embodiments of this disclosure. The first solid-state switch device 114 can be switched open to disconnect the load 108 from the first power source 102 using the algorithm. The second solid-state switch device 118 can be controlled based on a phase angle difference and a starting angle to limit inrush current during the transfer process to the second power source 104. In some embodiments, the algorithm can switch the second solid-state switch device 118 on (closed) when the flux of load transformer 110 matches the voltage of the second power source 104. In other embodiments, the algorithm can selectively switch the second solid-state switch device 118 on and off (closed and open) according to a current limiting range for the second solid-state switch device 118.

The system 100 can, in some embodiments, include a control circuit 120. The control circuit 120 can be coupled to one or more components of the system 100. The control circuit 120 can, in some embodiments, be coupled to the static transfer switch 106, and the control circuit 120 can operate the static transfer switch 106. The control circuit 120 can, in some embodiments, selectively control a position of each of the first solid-state switch device 114 and the second solid-state switch device 118 of the static transfer switch 106 so as to maintain a continuous supply of power to the load 108 from one of the first power source 102 and the second power source 104 responsive to the detected parameters of the first power source 102 and the second power source 104.

During a nominal condition, the control circuit 120 can, in some embodiments, connect the load 108 to a preferred one of the first power source 102 and the second power source 104 by driving the corresponding one of the first solid-state switch device 114 and the second solid-state switch device 118 of the static transfer switch 106 to the closed position.

Responsive to detecting a fault at the power source that is connected to the load, the control circuit 120 can, in some embodiments, disconnect the load 108 from the faulty power source by driving the corresponding one of the first solid-state switch device 114 and the second solid-state switch device 118 of the static transfer switch 106 to switch to the open position at an instance of the fault detection using the algorithm. The control circuit 120 can, in some embodiments, transfer the load 108 from the faulty power source to the working power source (i.e., power source not currently experiencing the electrical fault) by driving the corresponding one of the first solid-state switch device 114 and the second solid-state switch device 118 based on a phase angle difference between power source 102 and power source 104 and a starting phase angle using the algorithm. In some embodiments, based on the phase angle difference between power source 102 and power source 104 and the starting phase angle, the algorithm can implement a DIR algorithm to transfer the load between power sources. In other embodiments, based on the phase angle difference between power source 102 and power source 104 and the starting phase angle, the algorithm can implement an FCL algorithm to transfer the load between power sources.

Figure 3:
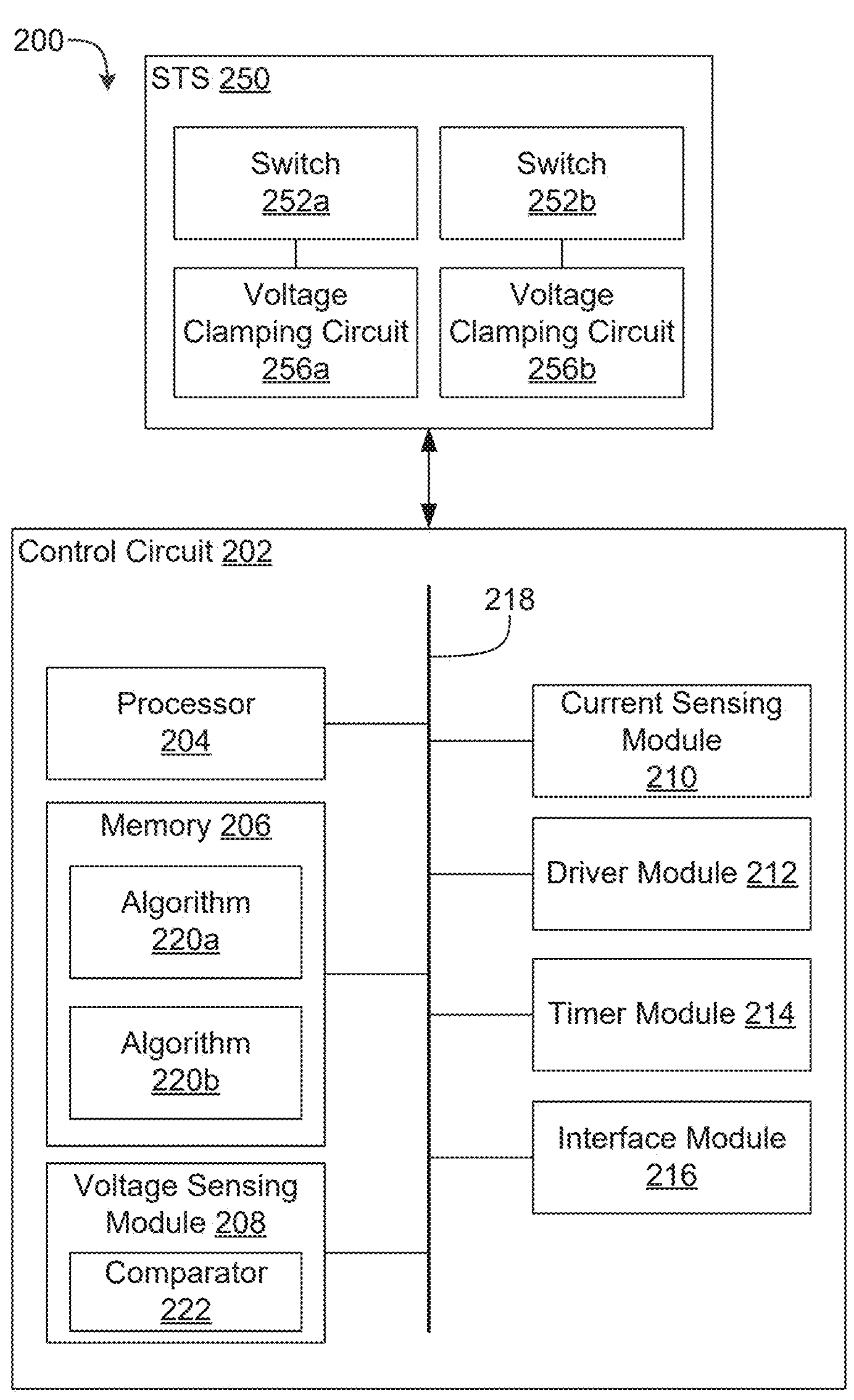
FIG. 3 is a block diagram of a system, according to some embodiments.

FIG. 3 is a block diagram of a system 200, according to some embodiments. The system 200 can be implemented with any combination of components or sub-systems of system 100 of FIG. 1 or FIG. 2. The system 200 can be an embodiment of system 100 of FIG. 1 or FIG. 2.

The system 200 can include a control circuit 202 and a static transfer switch (STS) 250 coupled to control circuit 202. Control circuit 202 can be an embodiment of control circuit 120 of FIG. 2, according to some embodiments. Control circuit 202 can be coupled to one or more components of system 200 including, but not limited to, STS 250, and control circuit 202 can control an operation of the electrical components of STS 250. The static transfer switch can, in some embodiments, be static transfer switch 106 of FIG. 1 or FIG. 2.

STS 250 can, in some embodiments, correspond to static transfer switch 106 of FIG. 1 or FIG. 2. STS 250 can include multiple switches 252 (shown as switch **252*a*, 252*b*). Switch 252*a* can, in some embodiments, be positioned on a first branch of the STS 250. Switch 252*b* can, in some embodiments, be positioned on a second branch of the STS 250. Each switch 252 can also include a voltage clamping circuit 256 (shown as voltage clamping circuit 256*a*, 256*b*) coupled to the switch 252. For a given switch 252, the corresponding voltage clamping circuit 256 can be configured to fix at least one of a positive or negative peak of a corresponding voltage waveform to a defined voltage. The voltage clamping circuits 256 can be configured to fix the voltage waveform at the corresponding switch device 252 to the defined voltage based on an output signal from the comparator, as will be further described herein. In some embodiments, STS 250 can include a voltage clamping circuit 256*a* coupled to switch device 252*a* and a voltage clamping circuit 256*b* coupled to switch device 252*b***.

The control circuit 202 can, in some embodiments, include a processor 204, a memory 206, a voltage sensing module 208, a current sensing module 210, a driver module 212, a timer module 214, and an interface module 216. Control circuit 202 can include a bus 218. Each module of control circuit 202 can be in electronic communicable connection with one or more other modules of control circuit 202 via bus 218. In some embodiments, control circuit 202 can be referred to herein as a controller, and control circuit 202 can be configured to monitor electrical parameters of the system 200 and control one or more components of system 200 responsive to the measured parameters in accordance with a control logic including, for example, the FCL algorithm. For example, the control circuit 202 can operate the static transfer switch 106 (FIG. 1 or FIG. 2) to transfer the load from the first power source 102 (FIG. 1 or FIG. 2) to the second power source 104 (FIG. 1 or FIG. 2) responsive to detecting an abnormal condition at the first power source 102 (FIG. 1 or FIG. 2).

The processor 204 can be configured to execute instructions stored in the memory 206. The instructions stored in memory 206 can, in some embodiments, include a control logic for control circuit 202. The instructions stored in memory 206 can include algorithm **220*a* and algorithm 220*b*, which can be collectively referred to herein as algorithm 220. The control circuit 202 can utilize one of algorithm 220***a* and algorithm 220*b* to control the static transfer switch 106 (FIG. 1 or FIG. 2) when transferring the load 108 (FIG. 1 or FIG. 2) from the preferred power source to the alternate power source. In some embodiments, the control circuit 202 can select one of algorithm 220*a* and algorithm 220*b* for transferring the load 108 (FIG. 1 or FIG. 2) based on a phase angle difference between the preferred power source and the alternate power source. In some embodiments the control circuit 202 can also select one of algorithm 220*a* and algorithm 220*b* for transferring the load 108 (FIG. 1 or FIG. 2) based on a starting phase angle of the alternate power source.

System 200 can include sensors (not shown) to measure electrical parameters at different locations of an AC electrical distribution system including, for example, first power source 102, second power source 104, static transfer switch 106, first solid-state switch device 114, second solid-state switch device 118, load 108, load transformer 110, other components, or any combination thereof, of FIG. 1. Control circuit 202 can, in some embodiments, be connected to the sensors (not shown) to monitor the electrical parameters of the AC electrical distribution system.

The voltage sensing module 208 can be connected to sensors (not shown) to monitor a voltage waveform of the system 200. The voltage sensing module 208 can in some embodiments include sensors to monitor a voltage waveform of each of the power sources. For example, the voltage sensing module 208 can monitor a voltage waveform of the first power source 102 and second power source 104 of FIG. 1 or FIG. 2. In some examples, voltage sensing module 208 can monitor a voltage waveform from the transformer 110 or the load 108 to calculate the transformer flux. The voltage sensing module 208 can in some embodiments receive measurement signals representative of the voltage at each of the power sources from the sensors, and the control circuit 202 can calculate a value characterizing a phase angle difference between the power sources based on the measurement signals. The control of static transfer switch 106 (FIG. 1 or FIG. 2) during the transfer process can be based on the calculated phase angle difference.

The current sensing module 210 can be connected to sensors to monitor a current of the system 200. The current sensing module 210 can in some embodiments include current sensors to monitor an electrical current of the static transfer switch 106 (FIG. 1 or FIG. 2). For example, the current sensing module 210 can monitor a current at the first solid-state switch device 114 and the second solid-state switch device 118 of FIG. 1 or FIG. 2. The current sensing module 210 can in some embodiments receive measurement signals representative of the current at the one of the first solid-state switch device 114 (FIG. 1 or FIG. 2) and second solid-state switch device 118 (FIG. 1 or FIG. 2) of the static transfer switch 106 (FIG. 1 or FIG. 2) being used during the transfer process, and the control circuit 202 can selectively switch the one of the first solid-state switch device 114 (FIG. 1 or FIG. 2) and second solid-state switch device 118 (FIG. 1 or FIG. 2) open and closed to limit the measured current based on a defined current limit. In some embodiments, the defined current limit can be a variable current limit determined by the algorithm 220.

Control circuit 202 can, in some embodiments, include a comparator 222. Comparator 222 can be a circuit or device embodied in control circuit 202 and/or one of its modules and configured to compare parameters of the switch devices 252 to corresponding reference voltages. In some embodiments, the comparator 222 can be configured to compare the at least one parameter of the alternate switch device to a first reference voltage corresponding to the upper limit value and a second reference voltage corresponding to the lower limit value. The alternate switch device can be, in some embodiments, switch device 252*a* or switch device 252*b*. In some embodiments, switch device 252*a* can correspond to first solid-state switch device 114 of FIG. 1 and switch device 252*b* can correspond to second solid-state switch device 118 of FIG. 1. Control circuit 202 can be configured to determine a turn-on instant and a turn-off instant of the switch devices 252 based on an output from the comparator 222. In some embodiments, control circuit 202 can determine the turn-on instant and a turn-off instant of the switch device 252*a* based on an output signal from the comparator 222. In other embodiments, control circuit 202 can determine the turn-on instant and a turn-off instant of the switch device 252*b* based on an output signal from the comparator 222. In some embodiments, voltage sensing module 208 can include the comparator 222.

The control circuit 202 can calculate a phase angle difference between the preferred and alternate power sources by determining an angular difference between corresponding points on their corresponding voltage and current waveforms to determine how much one waveform leads or lags the other in time, according to some embodiments. In one example, in some embodiments, the phase angle difference can be determined by measuring a time delay between points on the waveform and converting it into an angle. In another example, in some embodiments, the phase angle difference can be determined using impedance (Z), resistance (R), and inductive reactance (X_L) of a circuit. In yet another example, in some embodiments, the phase angle difference can be determined using phasors corresponding to vectors with magnitude and direction representative of voltage and current, and the angle between two phasors representative of the phase angle.

The control circuit 202 can also determine a starting phase angle for the power source being connected to the load 108 (FIG. 1 or FIG. 2), according to some embodiments. The starting phase angle can refer to an initial angular position of a voltage waveform of the power source when first connected to the load 108 (FIG. 1 or FIG. 2) after the transfer. For example, system 200 can include sensors to sense a voltage waveform at the first power source 102 and second power source 104 of FIG. 1 or FIG. 2 to allow the control circuit 202 to determine the starting angle of the second power source 104 when load 108 (FIG. 1 or FIG. 2) is transferred from first power source 102 to second power source 104 based on the measurement signals from the corresponding sensors.

The driver module 212 can include one or more gate drivers to output gate signals to cause the solid-state switch devices of the static transfer switch 106 (FIG. 1 or FIG. 2) to switch open and closed (i.e., turn off and on). The driver module 212 can, in some embodiments, output a first gate signal to drive a corresponding solid-state switch device of the static transfer switch 106 (FIG. 1 or FIG. 2) to switch closed (or turn on). The first gate signal can be applied to cause the solid-state switch device to switch closed and connect the load to the corresponding power source. For example, during the transferring of the load from the first power source 102 (FIG. 1 or FIG. 2) to the second power source 104 (FIG. 1 or FIG. 2), the driver module 212 can output the first gate signal to drive the second solid-state switch device 118 (FIG. 1 or FIG. 2) to switch closed responsive to the current at the second solid-state switch device 118 (FIG. 1 or FIG. 2) exceeding or reaching a lower current limit of the variable current limit. The driver module 212 can, in some embodiments, output a second gate signal to drive the corresponding solid-state switch device of the static transfer switch 106 (FIG. 1 or FIG. 2) to switch open (or turn off). The second gate signal can be applied to cause the solid-state switch device to switch open and disconnect the load from the corresponding power source. For example, during the transferring of the load from the first power source 102 (FIG. 1 or FIG. 2) to the second power source 104 (FIG. 1 or FIG. 2), the driver module 212 can output the second gate signal to drive the second solid-state switch device 118 (FIG. 1 or FIG. 2) to switch open responsive to the current at the second solid-state switch device 118 (FIG. 1 or FIG. 2) exceeding or reaching an upper current limit of the variable current limit.

The timer module 214 can calculate a time for transferring the load from the faulty power source to the working power source based on the current limit. The calculated transfer time can in some embodiments be a prediction of the total transfer time to connect the load to the working power source from the faulty power source using the corresponding one or more solid-state switch device of the static transfer switch based on the current limit and the phase angle difference between the power sources. For example, the timer module 214 can calculate the time to transfer the load 108 from the first power source 102 (FIG. 1 or FIG. 2) to the second power source 104 (FIG. 1 or FIG. 2) using the second solid-state switch device 118 (FIG. 1 or FIG. 2) of the static transfer switch 106 (FIG. 1 or FIG. 2).

The control circuit 202 can be in electronic communicable connection with one or more other components of the system 200 through the interface module 216. In some embodiments, the interface module 216 can be connected to the sensors to receive the sensor's measurement signals, and one or more of the functional modules of control circuit 202 can include circuitry to process the measurement signals. One or more other functional modules of control circuit 202 can control the static transfer switch 106 based on the processed measurement signals such as, for example, initiating a transfer from the preferred power source to the alternate power source based on detecting fluctuations at the preferred power source connected to the load 108 (FIG. 1 or FIG. 2). In some embodiments, the interface module 216 can be connected to the static transfer switch 106 to control an operation of the solid-state switch devices of the static transfer switch 106 to connect the load 108 (FIG. 1 or FIG. 2) to one of the first power source 102 (FIG. 1 or FIG. 2) and the second power source 104 (FIG. 1 or FIG. 2). In some embodiments, the interface module 216 can be connected to the first solid-state switch device 114 (FIG. 1 or FIG. 2) to connect (or disconnect) the load 108 (FIG. 1 or FIG. 2) to the first power source 102 (FIG. 1 or FIG. 2), and the interface module 216 can be connected to the second solid-state switch device 118 to connect (or disconnect) the load 108 (FIG. 1 or FIG. 2) to the second power source 104 (FIG. 1 or FIG. 2). It is to be appreciated that the control circuit 202 can be connected to other components or devices of system 200 through the interface module 216. For example, the control circuit 202 can be connected to one or more circuit breakers to serve as backup circuit interrupters between the load and the power sources. For example, the control circuit 202 can be connected to a computing device via the interface module 216 such that a user can input parameters of the static transfer switch 106 including, but not limited to, a nominal inrush current, a maximum allowable inrush current, a look-up table, or any combination thereof.

The control circuit 202 can use one or more of the modules to monitor electrical parameters of system 200, and the control circuit 202 can transfer the load 108 (FIG. 1 or FIG. 2) between power sources based on detecting fluctuations at the connected power source (e.g., preferred power source). During the transfer, the control circuit 202 can obtain the measurement signals from the sensors of system 200 to calculate the phase angle difference between the power sources and a starting angle of the alternate power source (e.g., power source not experiencing fluctuations), and can determine whether to control the static transfer switch 106 using the first algorithm or the second algorithm to transfer the load 108 (FIG. 1 or FIG. 2) to the alternate power source based on the calculated phase angle difference and the starting angle.

Based on the phase angle difference being in a first range, the control circuit 202 can, in some embodiments, transfer the load 108 (FIG. 1 or FIG. 2) using algorithm 220*a*, which can be used to turn the corresponding solid-state switch device(s) of static transfer switch 106 on when load transformer 110 (FIG. 1 or FIG. 2) flux matches the prospective flux of the alternate power source voltage. However, transfer times using algorithm 220*a* can take longer for phase angle differences outside the first range because it takes longer for the alternate source voltage to match with the load transformer 110 (FIG. 1 or FIG. 2) flux. Based on the phase angle difference being in a second range, the control circuit 202 can, in some embodiments, transfer the load 108 (FIG. 1 or FIG. 2) using algorithm 220*b*, which can be used to control the switching (i.e., selective switching) of the corresponding solid-state switch device(s) of static transfer switch 106 (FIG. 1 or FIG. 2) on and off to maintain load current within a defined current limiting range. It should be appreciated that the first range may or may not be contiguous with the second range. Accordingly, in some embodiments, there may be an intermediate range between the first range and the second range, or vice versa.

Control circuit 202 can, in some embodiments, perform the transfer process using algorithm 220*b*, which can initiate the transfer process with the corresponding solid-state switch device of static transfer switch 106 for connecting the load 108 (FIG. 1 or FIG. 2) to the preferred power source turned off. When the preferred switch current Ipri decreases to a low limit threshold having a value set at or near 0 A, the control circuit 202 can turn on the alternate solid-state switch device of static transfer switch 106 (FIG. 1 or FIG. 2) to transfer the load 108 (FIG. 1 or FIG. 2) to the alternate power source. For example, the low limit threshold can be between 0 A to 2 A, and the control circuit 202 can turn on the alternate switch device 252 of STS 250 based on the preferred switch current reaching the low limit threshold. The algorithm 220*b* of control circuit 202 can limit the load current at the alternate switch Isec between an upper limit threshold Ilim_u and a lower limit threshold Ilim_l. In some embodiments, the algorithm 220*b* can turn on the alternate switch of static transfer switch 106 when the switch current Isec is less than the Ilim_l, and the algorithm 220*b* can turn off the alternate switch of static transfer switch 106 when the switch current Isec is greater than (e.g., exceeds) the Ilim_u. In other embodiments, the algorithm 220*b* can turn on the alternate switch of static transfer switch 106 when the switch current Isec is less than (e.g., falls under) or equal to the Ilim_l, and the algorithm 220*b* can turn off the alternate switch of static transfer switch 106 when the switch current Isec is greater than or equal to the Ilim_u. The upper limit threshold Ilim_u can, in some embodiments, be set below a maximum allowable inrush current threshold of the static transfer switch 106 during the transfer. The lower limit threshold Ilim_l can, in some embodiments, be set between 0 A and the upper limit Ilim_u. The upper current limit can, in some embodiments, be based on a thermal limit of the solid-state switch devices. In some embodiments, during the selective switching of a corresponding one of the switch devices 252 used to connect the load to the alternate power source, control circuit 202 can be configured to monitor an energy dissipation at the switch device 252 and the corresponding voltage clamping circuit 256 according to the corresponding thermal limit. The energy dissipation can be monitored using one or more sensors (not shown) coupled to control circuit 202, according to some embodiments. It should be appreciated that the electric current is AC, and the AC current can have both positive and negative values, and its absolute value is compared to the current limits Ilim_u and Ilim_l.

During the transfer process, to connect the load to the alternate power source, control circuit 202 can, in some embodiments, maintain load current at the alternate switch within a defined current limiting range using algorithm **220*b*. In some examples, control circuit 202 can continue to selectively switch the alternate solid-state switch device of static transfer switch on and off to maintain load current at the alternate switch within the defined current limiting range until a load transformer flux matches the alternate power source. During the transfer process, to connect the load to the alternate power source, control circuit 202 can, in other embodiments, maintain load current at the alternate switch within a variable current limiting range using algorithm 220*b*. In some examples, control circuit 202** can continue to selectively switch the alternate solid-state switch device of static transfer switch on and off to maintain load current at the alternate switch within the variable current limiting range until a load transformer flux matches the alternate power source. The variable current limiting thresholds, or variable upper and lower current limits, can, in some embodiments, be based on a reference current calculated from the alternative power source. The reference current can, in some embodiments, be determined by calculating an optimal trajectory of the current limiting/hysteresis control, which can, in some embodiments, be based on estimation of the flux of the load transformer or the phasor of the current.

The variable current limiting range can result in a sinusoidal AC waveform with less harmonics during the transfer process compared to a current limiting range having fixed boundaries, e.g., fixed upper and lower current limits. For example, in system 200, transferring the load from the preferred power source to the alternate power source using the variable current limiting range can result in a total harmonic distortion of 10.7% for a first phase, and transferring the load from the preferred power source to the alternate power source using the fixed current limiting range can result in a total harmonic distortion of 15.4% for the first phase. Control circuit 202 can, in some embodiments, selectively switch the alternate switch or switches open and close to maintain load current within the current limiting range until a load transformer flux matches the alternate source voltage using algorithm **220*b*. Control circuit 202 can, in some embodiments, continue to selectively switch the alternate switch devices until 90% RMS voltage of a first line cycle after a clemency time is achieved at the alternate switch using algorithm 220*b***.

The control circuit 202 can, in some embodiments, include a timer used to control the switching of the alternate switches of static transfer switch 106 using algorithm **220*b*. The control circuit 202 can measure the time to, in some embodiments, mark completion of the transfer using algorithm 220*b* with a transfer time limit of Ttrans_max. For example, the transfer time limit Ttrans_max can be set at 20 msec. In some embodiments, the control circuit 202 can control the switching of the static transfer switch 106 (FIG. 1 or FIG. 2) using algorithm 220 until the load transformer 110 (FIG. 1 or FIG. 2) flux matches the alternate power source or until the timer reaches the transfer time limit Ttrans_max. When using algorithm 220*b* to transfer the load, certain types of downstream faults may prevent the load transformer 110 (FIG. 1 or FIG. 2) flux from matching the alternate power source. The transfer time limit Ttrans_max can limit a total duration of the high frequency switching performed by the alternate switch using algorithm 220*b*, thereby preventing damage to the alternate switch or switches. During the high frequency switching by the alternate switch, in response to the transfer time exceeding Ttrans_max, the control circuit 202 can switch the alternate switch off (i.e., open) and maintain the alternate switch in the open position indicative that there may be a downstream fault. Ttrans_max can, in some embodiments, be defined based on a thermal capacity of the static transfer switch 106 and/or the solid-state switch devices of the static transfer switch 106**.

Figure 4:
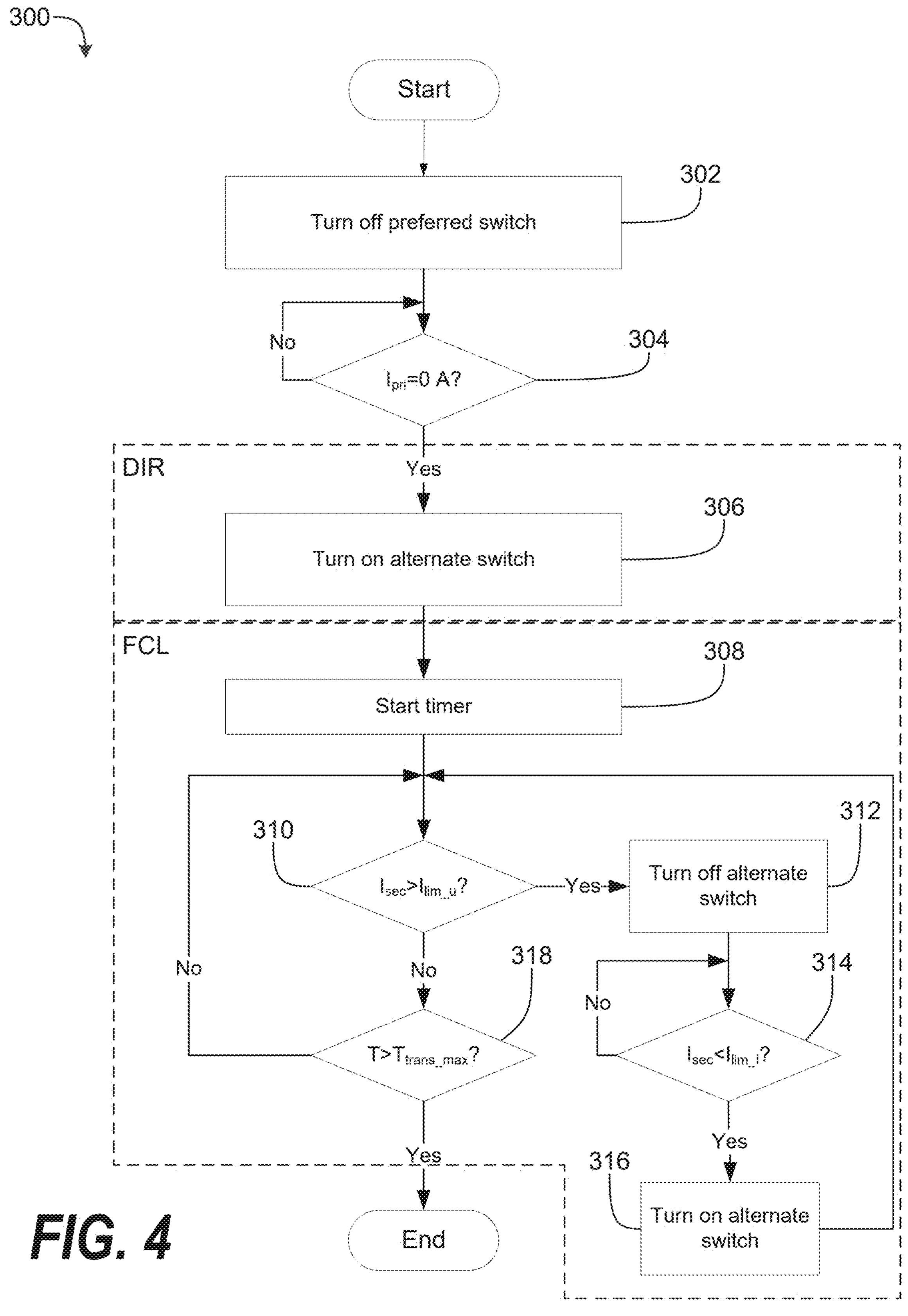
FIG. 4 is a flow diagram of a method for transferring a load between power sources, according to some embodiments.

FIG. 4 is a flow diagram of a method 300 for transferring a load between power sources, according to some embodiments. The method 300 can, in some embodiments, be implemented using the system 100 of FIG. 1 or FIG. 2, or the system 200 of FIG. 3.

At 302, the method 300 can include turning off a preferred switch. Turning off the preferred switch can disconnect the load 108 (FIG. 1 or FIG. 2) from the preferred power source. For example, the first power source 102 (FIG. 1 or FIG. 2) can be the preferred power source. The static transfer switch 106 (FIG. 1 or FIG. 2) can, in some embodiments, include preferred switch. The preferred switch can, in some embodiments, include one or more switches. For example, the static transfer switch 106 (FIG. 1 or FIG. 2) can include a preferred switch connecting each phase of the preferred power source to the load 108 (FIG. 1 or FIG. 2).

At 304, the method 300 can include determining whether the load current at the preferred switch Ipri is at or near 0 A (Amps) (e.g., a low limit threshold). The method 300 can, in some embodiments, include continuing to monitor the load current at the preferred switch until the load current at the preferred switch is at or near 0 A.

At 306, the method 300 can include turning on the alternate switch. The alternate switch can, in some embodiments, be turned on in response to the load current at the preferred switch being at or near 0 A. The alternate switch can, in some embodiments, be turned on when the load current at the primary switch is at or near 0 A to limit an inrush current at the static transfer switch 106 (FIG. 1 or FIG. 2).

At 308, the method 300 can include starting a timer. The timer can be started to measure a time of implementing a fault current limiting (FCL) algorithm such as, for example, algorithm **220*b* (FIG. 3). It should be appreciated that the timer can be started following the turning on of the alternate switch, or at other time periods during method 300**. For example, in some embodiments, the timer can be started following the turning off of the primary switch and before the determining whether the load current at the preferred switch Ipri is at or near 0 A (Amps), among other time periods.

At 310, the method 300 can include determining if the load current at the alternate switch Isec is greater than an upper current limit threshold Ilim_u. The upper current limit threshold can, in some embodiments, be based on an inrush current threshold of the system that the static transfer switch 106 applies for. The upper current limit threshold can, in some embodiments, be based on an inrush current threshold of the switch devices of the static transfer switch 106 that connect the load 108 (FIG. 1 or FIG. 2) to the corresponding power source. The inrush current threshold can, in some embodiments, be based on a threshold current limit that can be handled by the different components in the system. The inrush current threshold can, in other embodiments, be based on a thermal operating limit of the switches. The load current at the alternate switch can be measured using, for example, current sensors.

The static transfer switch 106 (FIG. 1 or FIG. 2) can, in some embodiments, include the alternate switch. The alternate switch can, in some embodiments, include one or more switches. For example, the static transfer switch 106 (FIG. 1 or FIG. 2) can include an alternate switch to connect each phase of the alternate power source to the load 108 (FIG. 1 or FIG. 2) using one of algorithm 220*a* or algorithm 220*b* of FIG. 3.

At 312, the method 300 can include turning off the alternate switch. The alternate switch can, in some embodiments, be turned off in response to the load current at the alternate switch being greater than the upper current limit threshold. The alternate switch can, in some embodiments, be turned off when the load current at the alternate switch is greater than or equal to the upper current limit threshold.

At 314, the method 300 can include determining if the load current at the alternate switch Isec is less than a lower current limit threshold Ilim_l. The method 300 can, in some embodiments, include determining if the load current at the alternate switch Isec is less than or equal to a lower current limit threshold Ilim_l. The lower current limit threshold can, in some embodiments, be a value between 0 A and the upper current limit threshold Ilim_u. The method 300 can, in some embodiments, include continuing to monitor the load current at the alternate switch until the load current at the alternate switch is less than the lower current limit threshold.

At 316, the method 300 can include turning on the alternate switch. The alternate switch can, in some embodiments, be turned on in response to the load current at the alternate switch being less than the lower current limit threshold. The alternate switch can, in some embodiments, be turned on when the load current at the alternate switch is less than or equal to the lower current limit threshold.

At 318, the method 300 can include determining if the time the FCL algorithm is implemented since block 308 to control the switching of the alternate switch is greater than transfer time limit Ttrans_max. The method 300 can, in some embodiments, include continuing to control the switching of the alternate switch using the FCL algorithm based on the upper and lower current limit threshold until the time exceeds the transfer time limit Ttrans_max. The method 300 can, in some embodiments, include ending the control of the switching of the alternate switch using the FCL algorithm based on the upper and lower current limit threshold in response to the time exceeding the transfer time limit Ttrans_max.

It should be appreciated that one or more of the operations of method 300 can be performed at one or more phases, to transfer the load 108 (FIG. 1 or FIG. 2) between the power sources.

Figure 5:
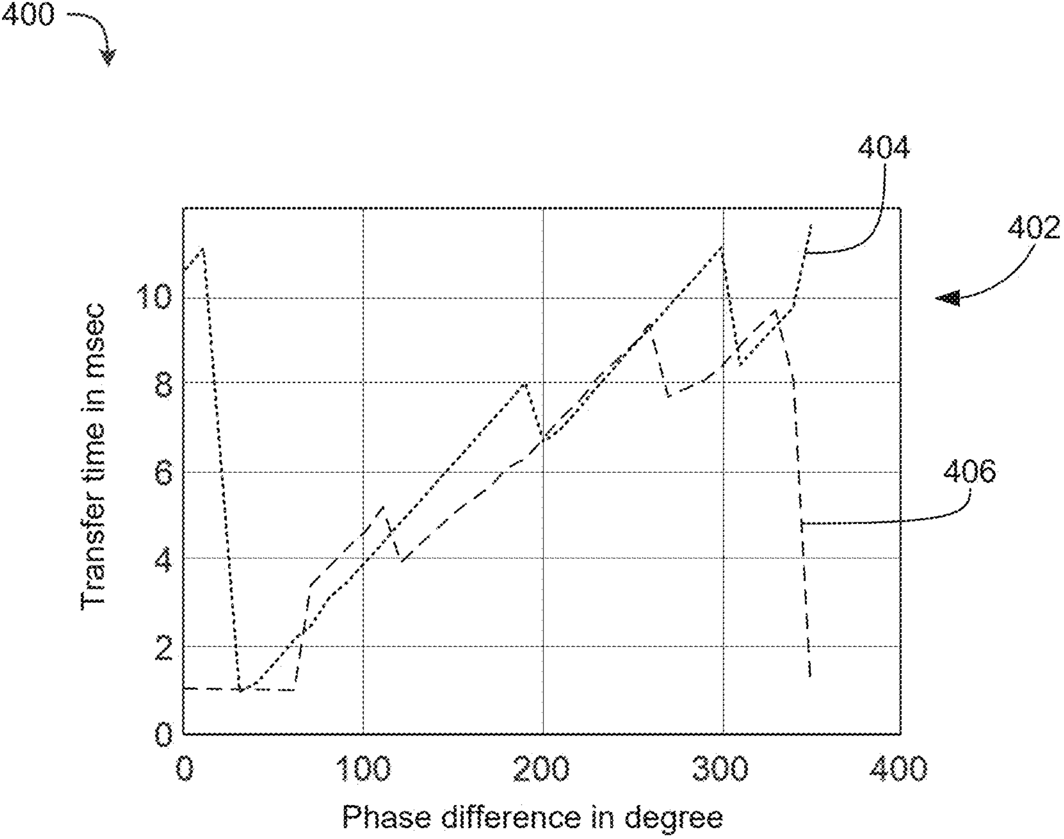
FIG. 5 is a graphical illustration of a transfer time-phase difference chart for an example system, according to some embodiments.

FIG. 5 is a graphical illustration of a transfer time-phase difference chart 400 for an example system, according to some embodiments. The system can be an embodiment of system 100 of FIG. 1 or FIG. 2, although other systems are possible. The chart 400 can be implemented with any combination of components and/or subsystems of system 100 of FIG. 1 or FIG. 2 or system 200 of FIG. 3.

In chart 400, the transfer times of a static transfer switch using an algorithm 220 is shown as graph 402. The transfer times of the static transfer switch using, for example, algorithm 220*a* (FIG. 3) based on phase angle difference is shown at line 404. The transfer times of the static transfer switch using, for example, algorithm 220*b* (FIG. 3) based on phase angle difference is shown at line 406. According to the phase angle difference a between the power sources ($0° < \alpha < 360°$), the control circuit 202 (FIG. 3) can implement one of the algorithm 220*a* (FIG. 3) or the algorithm 220*b* (FIG. 3) to control the alternate switches of the static transfer switch 106 (FIG. 1 or FIG. 2) that results in the lowest transfer time. In this regard, the system performance can be improved by implementing one of the control algorithms to control the static transfer switch that results in an improved transfer time over the other control algorithm based on the phase angle difference between the preferred and alternate power source. It should be appreciated that the algorithm used to control the alternate switches during the transfer process can be based on metrics other than, or in addition to, phase angle difference. These other metrics can include, for example and without limitation, a transfer time, a harmonic distortion during the transfer, a minimum number of switching actions during the transfer, other factors, or any combination thereof.

Figure 6:
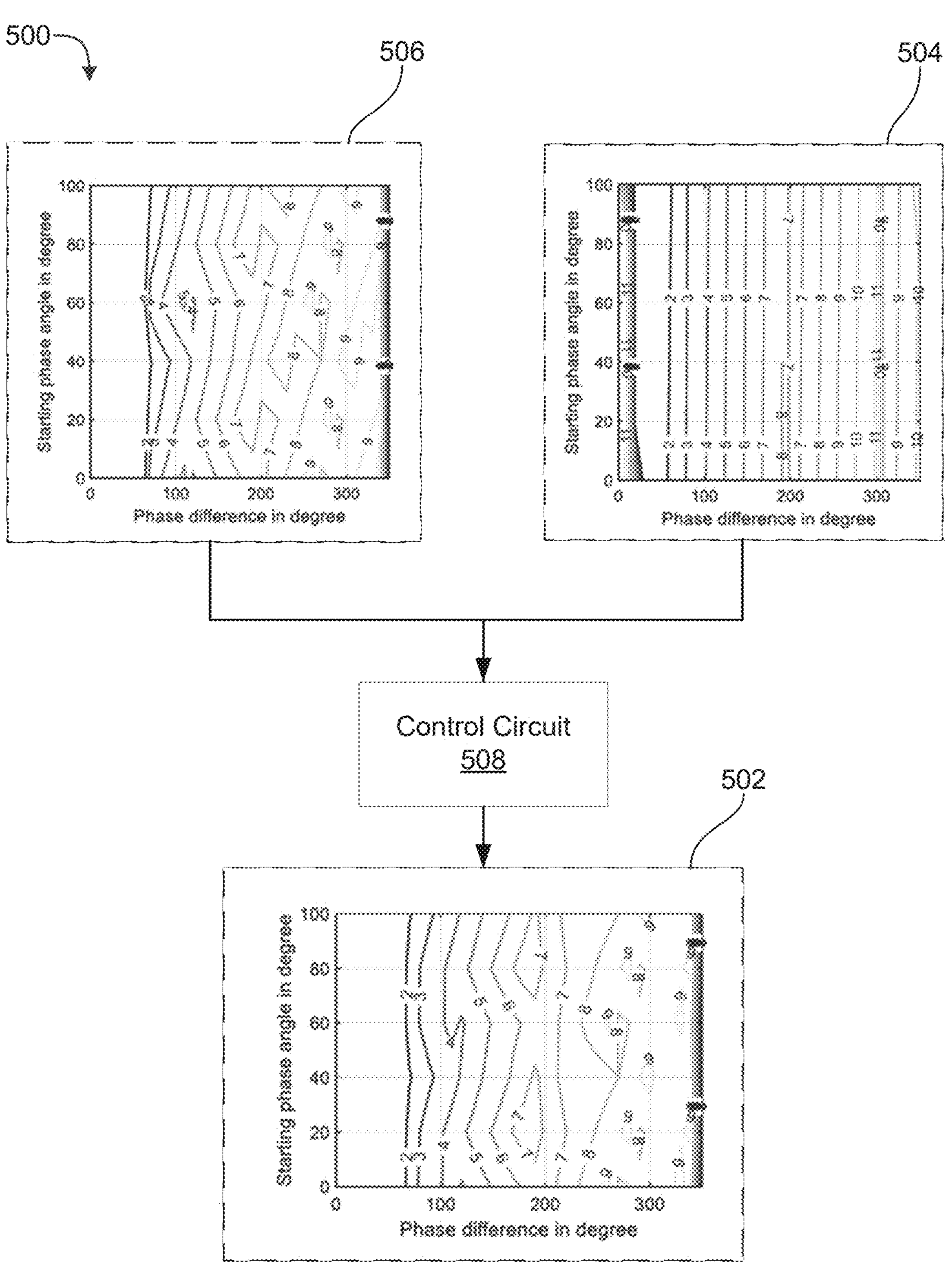
FIG. 6 is a graphical illustration of a starting phase angle-transfer time chart for an example system, according to some embodiments.

FIG. 6 is a graphical illustration of a starting phase angle-transfer time chart 500 for an example system, according to some embodiments. The system can be an embodiment of system 100 of FIG. 1 or FIG. 2 or system 200 of FIG. 3, although other systems are possible. The chart 500 can be implemented with any combination of components and/or subsystems of system 100 of FIG. 1 or FIG. 2 or system 200 of FIG. 3.

During the transfer process, the control circuit 508 can, in some embodiments, select the control algorithm for controlling the static transfer switch based on phase difference and starting phase angle of the transfer. The system can effectively combine the transfer times of algorithm 220*a* (FIG. 3) and algorithm 220*b* (FIG. 3) under different phase differences and starting phase angle conditions and can select one of algorithm 220*a* or algorithm 220*b* of FIG. 3 for controlling the transfer process based on the combined information to improve the transfer time of the static transfer switch 106 (FIG. 1 or FIG. 2). The transfer time chart 500 can, in some embodiments, be representative of the combined information of the transfer times of algorithm 220*a* (FIG. 3) and algorithm 220*b* (FIG. 3) under different phase differences and starting phase angle conditions.

The transfer time chart 500 can include a combined starting phase angle-transfer time chart 502, which can be based on combining a starting phase angle-transfer time chart 504 from using algorithm 220*a* (FIG. 3) and a starting phase angle-transfer time chart 506 from using algorithm 220*b* (FIG. 3). For example, the combined starting phase angle-transfer time chart 502 can be used to achieve an average transfer time of 5.30 msec for the phase differences, which can be a lower than an average transfer time for the phase differences using either of the algorithms alone under the same conditions. For example, the algorithm 220*a* (FIG. 3) alone can achieve an average transfer time of 6.65 msec, and the algorithm 220*b* (FIG. 3) alone can achieve an average transfer time of 5.42 msec. It should be appreciated that the average transfer times using the algorithm 220*a*, the algorithm 220*b*, or the combined algorithm including algorithm 220*a* and algorithm 220*b* of FIG. 3 are exemplary and not intended to be limiting.

Figure 7:
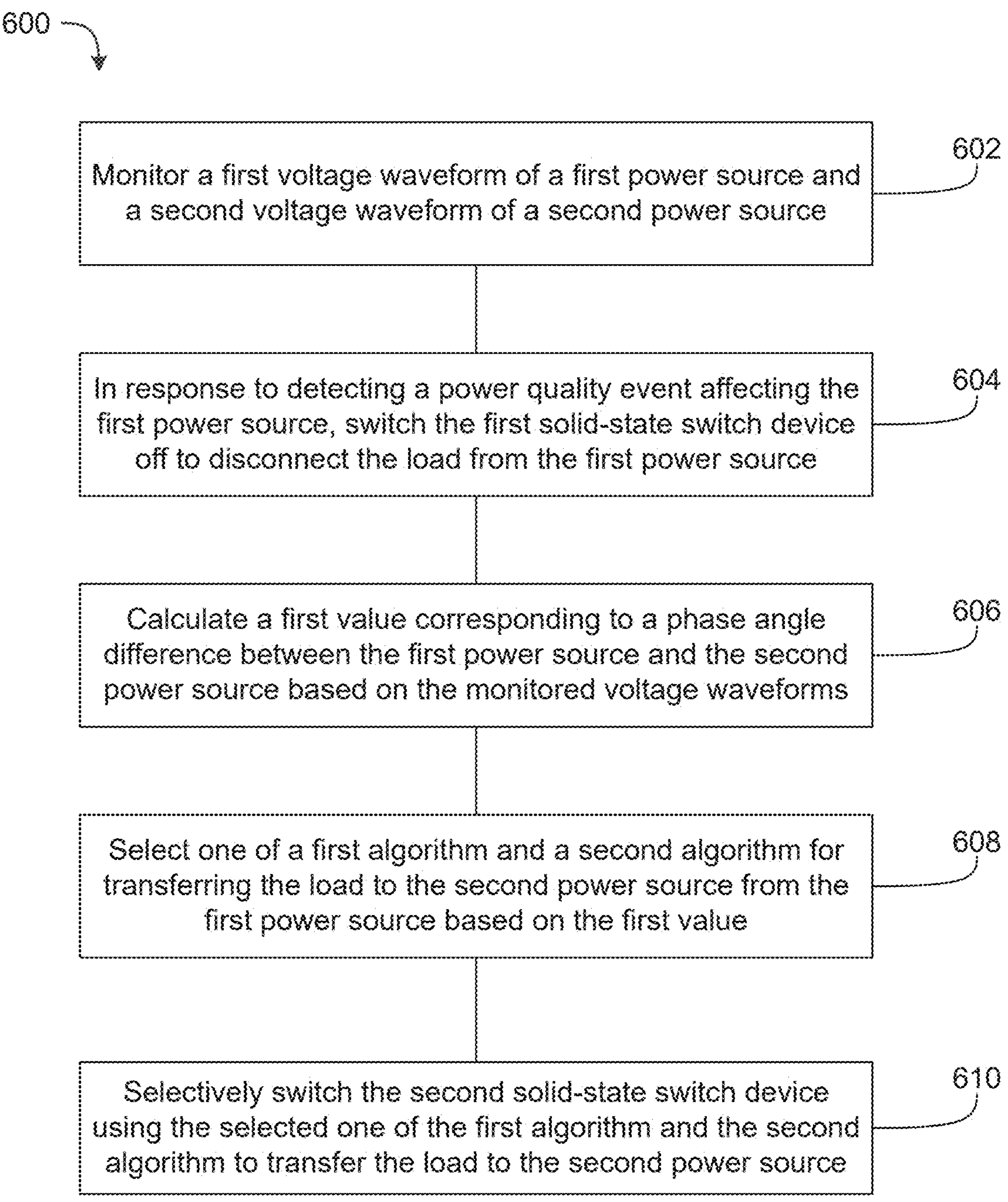
FIG. 7 is a flow diagram of a method for transferring a load between power sources, according to some embodiments.

FIG. 7 is a flow diagram of a method 600 for transferring a load between power sources, according to some embodiments.

Figure 8:
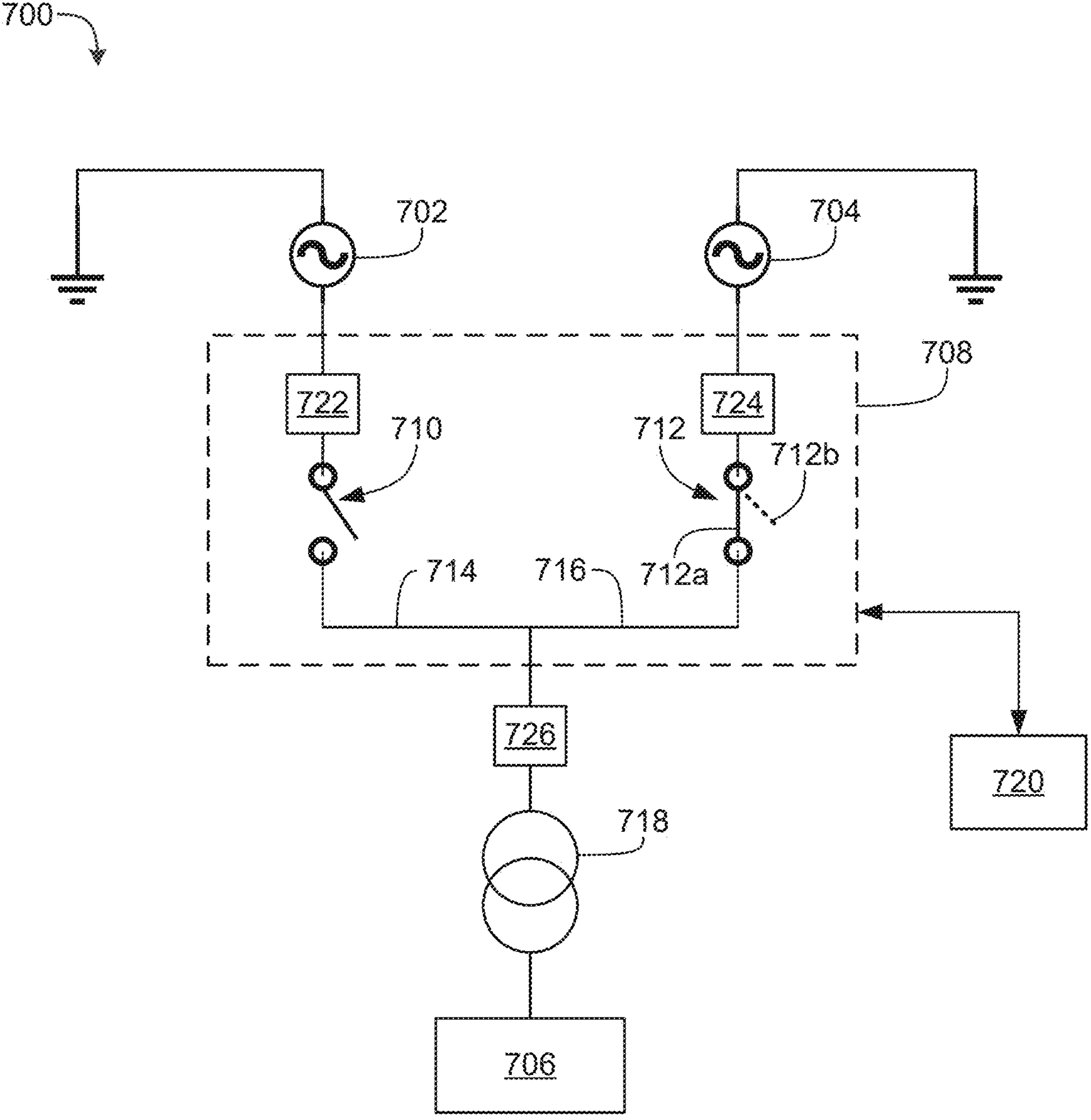
FIG. 8 is a schematic diagram of a system for performing the method of FIG. 7, according to some embodiments.

The method 600, or one or more portions of method 600, can be performed by system 100 of FIG. 1 or FIG. 2 or system 200 of FIG. 3. FIG. 8 is a schematic diagram of a system 700 for performing the method 600 of FIG. 7, according to some embodiments. The method 600 will be described in conjunction with system 700.

At 602, the method 600 can include monitoring a first voltage waveform of a first power source connectable to a load by a first solid-state switch device of the static transfer switch and a second voltage waveform of a second power source connectable to the load by a second solid-state switch device of the static transfer switch. In FIG. 8, the first power source is shown as power source 702, the second power source is shown as power source 704, the static transfer switch is shown as static transfer switch 708, the first solid-state switch device is shown as switch 710, the second solid-state switch device is shown as switch 712, and the load is shown as load 706. It should be appreciated that the first power source can, in some embodiments, correspond to power source 704, and the second power source can, in some embodiments, correspond to power source 702.

The monitoring can, in some embodiments, be performed with a control circuit associated with a static transfer switch of an AC distribution system. In some embodiments, the AC distribution system can include one phase, and the static transfer switch can be configured to connect the load to the one of the first power source and the second power source on the one phase. In some embodiments, the AC distribution system can include two phases, and the static transfer switch can be configured to connect the load to the one of the first power source and the second power source on the two phases. In some embodiments, the AC distribution system can include three phases, and the static transfer switch can be configured to connect the load to the one of the first power source and the second power source on the three phases. It should be appreciated that the AC distribution system can include more or less phases than those described in this disclosure, but the same or similar operations including the operation of switch devices according to one of the first or second algorithm can be performed at each of the phases in accordance with this disclosure. In FIG. 8, the AC distribution system is shown as system 700 and the control circuit is shown as control circuit 720. The monitoring can, in some embodiments, be performed using one or more sensors, which can be used to measure a voltage, a current, or both a voltage and current. In FIG. 8, the sensors are shown as sensor 722 and sensor 724.

At 604, the method 600 can include, in response to detecting a power quality event affecting the first power source, switching the first solid-state switch device off to disconnect the load from the first power source. The switching of the solid-state switch device of the static transfer switch can, in some embodiments, be performed by a controller connected to the static transfer switch. The power quality event can, in some embodiments, include an anomaly at the connected power source, which can include, for example, voltage fluctuations, frequency deviations, electrical faults, other like anomalies, or any combination thereof. In FIG. 8, switch 710 is shown as turned off and load 706 is disconnected from power source 702.

At 606, the method 600 can include calculating a first value corresponding to a phase angle difference between the first power source and the second power source based on the monitored voltage waveforms. The calculation of the phase angle difference can, in some embodiments, be calculated by the controller based on the monitored voltage waveforms.

At 608, the method 600 can include selecting one of a first algorithm and a second algorithm for transferring the load to the second power source from the first power source based on the first value. The controller connected to the static transfer switch can, in some embodiments, select the first or second algorithm based on the first value. In some embodiments, based on the calculated first value, the controller can be configured to select the one of the first algorithm and the second algorithm according to a metric of the load transfer associated with the first algorithm and the second algorithm. The metric can, in some embodiments, include a transfer time of the algorithm, a harmonic distortion during the transfer using the algorithm, a minimum number of switching actions during the transfer using the algorithm, or any combination thereof.

At 610, the method 600 can include selectively switching the second solid-state switch device using the selected one of the first algorithm and the second algorithm to transfer the load to the second power source. The selective switching can include, in some embodiments, turning the second solid-state switch device on to connect the load to the second power source. In other embodiments, the selective switching can include turning the second solid-state switch device on and off to control a current according to a current limiting range. The controller can, in some embodiments, control the switching of the solid-state switch device of the static transfer switch using one of the first algorithm and the second algorithm. The selective switching of the second solid-state switch device can, in some embodiments, be in response to a current at the first solid-state switch device decreasing to at or near 0 A.

The method 600 can, in some embodiments, further include calculating a second value corresponding to a starting angle for transferring the load to the second power source from the first power source. The controller can, in some embodiments, calculate the second value. In some embodiments, the selecting of the one of the first algorithm and second algorithm can be based on the first value and the second value. In some embodiments, the controller can be configured to select the one of the first algorithm and the second algorithm having the lowest transfer time for transferring the load to the second power source relative the other of the first algorithm and the second algorithm based on the first value and the second value.

In some embodiments, in response to selecting the first algorithm, the controller can be configured to switch on the second solid-state switch device at each phase to transfer the load to the second power source. In some embodiments, in response to selecting the second algorithm, the controller can be configured to selectively switch on and off the second solid-state switch device at each phase according to the current limiting range until the load transformer flux matches the second power source flux to transfer the load to the second power source. In some embodiments, the controller may be configured to selectively switch the second solid-state switch device on and off according to the current limiting range to transfer the load to the second power source until the load transformer flux matches the second power source flux or until a transfer time limit is reached.

Figure 9:
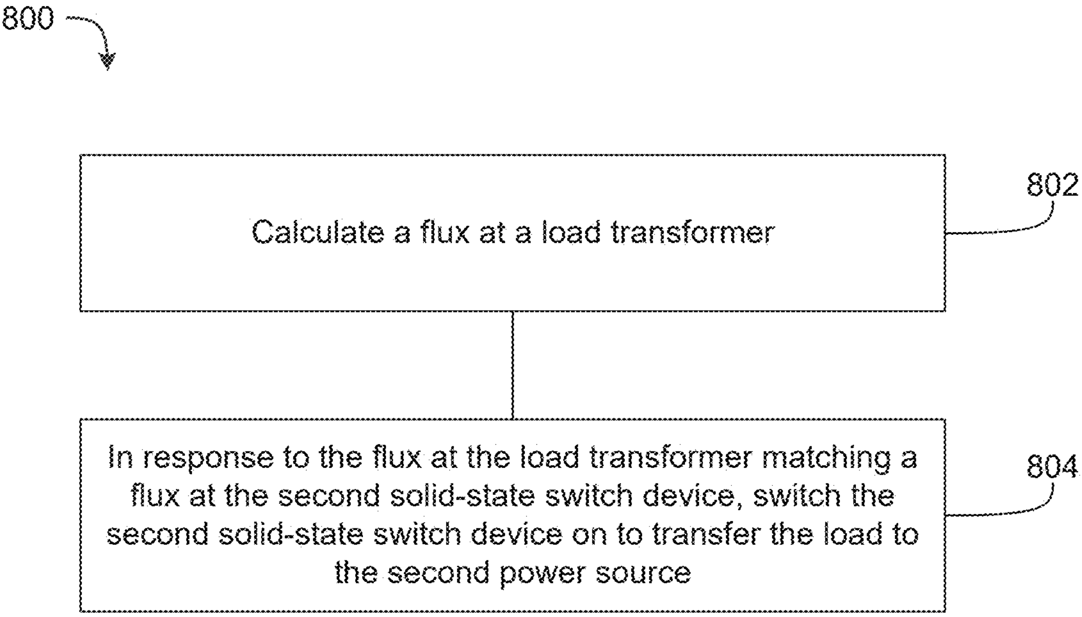
FIG. 9 is a flow diagram of a method for controlling a switching of the static transfer switch using the first algorithm, according to some embodiments.

FIG. 9 is a flow diagram of a method 800 for controlling a switching of the static transfer switch using the first algorithm, according to some embodiments. The method 800, or one or more portions of method 800, can be performed by system 100 of FIG. 1 or FIG. 2 or system 200 of FIG. 3. The method 800 can be an embodiment of method 600 of FIG. 7. The method 800 will be described in conjunction with system 700 of FIG. 8.

At 802, the method 800 can include calculating a third value corresponding to a flux at a load transformer. The controller can, in some embodiments, calculate the third value corresponding to the flux of the load transformer. In FIG. 8, the load transformer is shown as load transformer 718. In some embodiments, the third value can be based on a flux of the first power source when the first solid-state switch device is switched off to disconnect the load from the first power source.

At 804, the method 800 can include, in response to the flux at the load transformer matching a flux at the second solid-state switch device, switching the second solid-state switch device on to transfer the load to the second power source. The controller can, in some embodiments, drive the second solid-state switch device to turn on by sending a gate drive signal to the second solid-state switch device.

Figure 10:
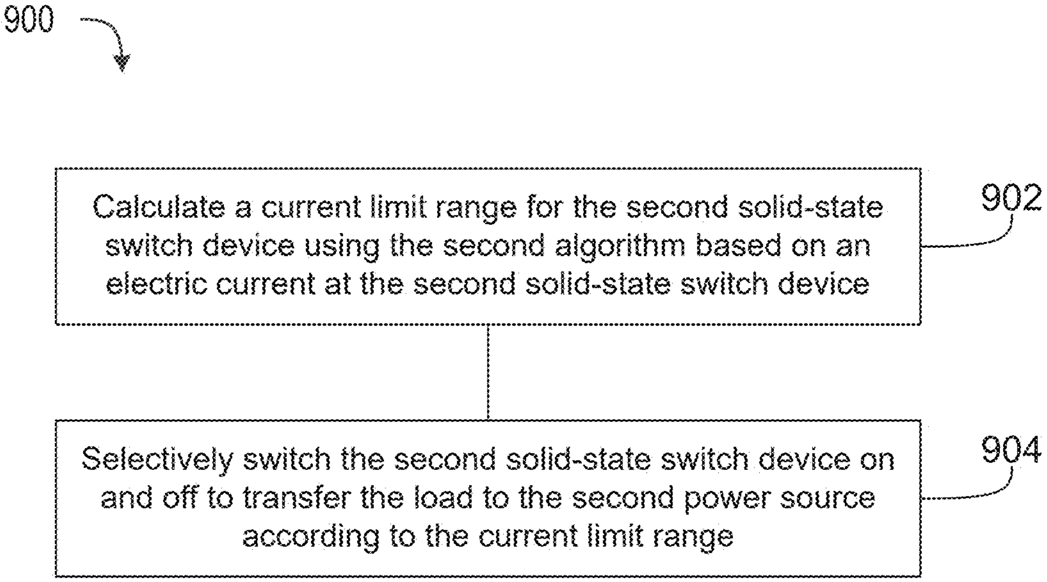
FIG. 10 is a flow diagram of a method for controlling a switching of the static transfer switch using the second algorithm, according to some embodiments.

FIG. 10 is a flow diagram of a method 900 for controlling a switching of the static transfer switch using the second algorithm, according to some embodiments. The method 900, or one or more portions of method 900, can be performed by system 100 of FIG. 1 or FIG. 2 or system 200 of FIG. 3. The method 900 can be an embodiment of method 600 of FIG. 7. The method 900 will be described in conjunction with system 700 of FIG. 8.

At 902, the method 900 can include calculating a current limiting range for the second solid-state switch device using the second algorithm based on an electric current at the second solid-state switch device. The controller can, in some embodiments, calculate the current limiting range for the second solid-state switch device using the second algorithm. The current limiting range can, in some embodiments, be based on the load current measured at the second solid-state switch device for the respective phase. In some embodiments, the current limiting range can include an upper limit value and a lower limit value relative a nominal current of the system or the second solid-state switch device. In some embodiments, the current limiting range can be configured to maintain the electric current at the second solid-state switch device below an inrush current threshold. In some embodiments, the current limiting range can include an upper current limit threshold that is based on (i.e., less than) an inrush current threshold limit of the solid-state switch device. The inrush current threshold limit can, in some embodiments, be based on a thermal design limit of the solid-state switch device. In other embodiments, the current limiting range can include an upper current limit threshold that is based on an inrush current threshold limit of the alternate power source that is connected to the load using the static transfer switch.

At 904, the method 900 can include selectively switching the second solid-state switch device on and off to transfer the load to the second power source according to the current limiting range. The controller can, in some embodiments, control the second solid-state switch device by selectively switching the second solid-state switch device on and off during the transfer process to transfer the load to the second power source based on the current limiting range.

Figure 11:
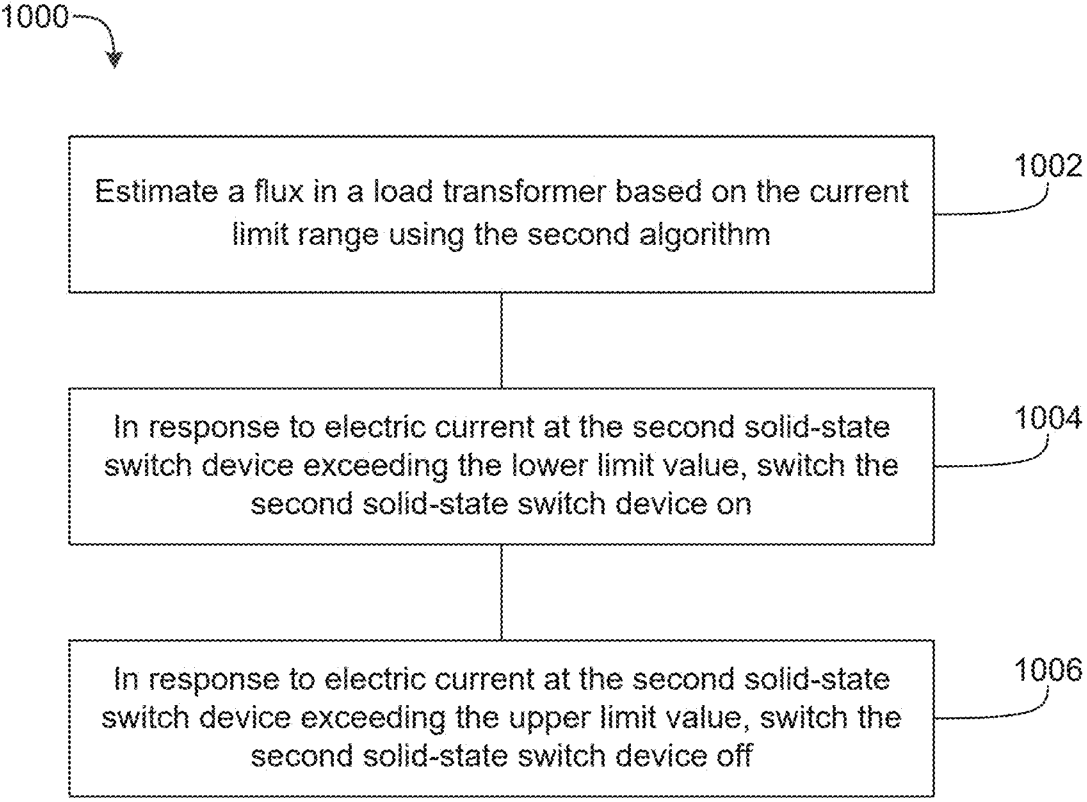
FIG. 11 is a flow diagram of a method for controlling the switching the static transfer switch using the second algorithm, according to some embodiments.

FIG. 11 is a flow diagram of a method 1000 for controlling the switching the static transfer switch using the second algorithm, according to some embodiments. The method 1000, or one or more portions of method 1000, can be performed by system 100 of FIG. 1 or FIG. 2 or system 200 of FIG. 3. The method 1000 can be an embodiment of method 600 of FIG. 7 or method 900 of FIG. 10. The method 1000 will be described in conjunction with system 700 of FIG. 8.

At 1002, the method 1000 can include estimating a flux in a load transformer based on the current limiting range using the second algorithm. In some embodiments, the controller can be configured to maintain the electric current at the second solid-state switch device at a defined trajectory based on the estimated flux to reduce a total harmonic distortion when transferring the load to the second power source.

At 1004, the method 1000 can include, in response to the electric current at the second solid-state switch device exceeding a lower limit value, switching the second solid-state switch device on.

At 1006, the method 1000 can include, in response to electric current at the second solid-state switch device exceeding the upper limit value, switching the second solid-state switch device off.

According to some embodiments, the method 1000 can further include monitoring a time period for transferring the load from the first power source to the second power source using the second solid-state switch device, and, in response to the time period exceeding a time limit, switching the second solid-state switch device off to disconnect the load from the second power source. The time limit can, in some embodiments, span from a time period when the second solid-state switch device is initially switched on to a time period when a load transformer flux matches the second power source voltage. In some embodiments, exceeding the time limit for transferring the load from the first power source (e.g., preferred power source) to the second power source (e.g., alternate power source) can be indicative of a downstream fault, and switching and maintaining the second solid-state switch device turned off can be to prevent or limit damage to one or more components of the system including, but not limited to, the second solid-state switch device, the load, the load transformer, the second power source, other components in the AC distribution system including the static transfer switch, or any combination thereof. In some embodiments, the time limit can be based on a capacity of energy storage devices connected to the load, the energy storage device configured to maintain a continuous supply of power to the load during the transfer and during, for example, fluctuations in the power received from the power source connected to the load. In other embodiments, the time limit for transferring the load from the first power source to the second power source can be defined based on a hold-up time limit associated with the load.

All prior patents and publications referenced herein are incorporated by reference in their entireties.

Throughout the specification and claims, the following terms take the meanings explicitly associated herein, unless the context clearly dictates otherwise. The phrases “in one embodiment,” “in an embodiment,” and “in some embodiments” as used herein do not necessarily refer to the same embodiment(s), though it can. Furthermore, the phrases “in another embodiment” and “in some other embodiments” as used herein do not necessarily refer to a different embodiment, although it can. All embodiments of the disclosure are intended to be combinable without departing from the scope or spirit of the disclosure.

As used herein, the term “based on” is not exclusive and allows for being based on additional factors not described, unless the context clearly dictates otherwise. In addition, throughout the specification, the meaning of “a,” “an,” and “the” include plural references. The meaning of “in” includes “in” and “on.”

As used herein, the term “between” does not necessarily require being disposed directly next to other elements. Generally, this term means a configuration where something is sandwiched by two or more other things. At the same time, the term “between” can describe something that is directly next to two opposing things. Accordingly, in any one or more of the embodiments disclosed herein, a particular structural component being disposed between two other structural elements can be: disposed directly between both of the two other structural elements such that the particular structural component is in direct contact with both of the two other structural elements; disposed directly next to only one of the two other structural elements such that the particular structural component is in direct contact with only one of the two other structural elements; disposed indirectly next to only one of the two other structural elements such that the particular structural component is not in direct contact with only one of the two other structural elements, and there is another element which juxtaposes the particular structural component and the one of the two other structural elements; disposed indirectly between both of the two other structural elements such that the particular structural component is not in direct contact with both of the two other structural elements, and other features can be disposed therebetween; or any combination(s) thereof.

As used herein “embedded” means that a first material is distributed throughout a second material.

ASPECTS

Various Aspects are described below. It is to be understood that any one or more of the features recited in the following Aspect(s) can be combined with any one or more other Aspect(s).

Aspect 1. A method comprising: monitoring, with a controller associated with a static transfer switch of an AC distribution system, a first voltage waveform of a first power source connectable to a load by a first solid-state switch device of the static transfer switch and a second voltage waveform of a second power source connectable to the load by a second solid-state switch device of the static transfer switch; in response to detecting a power quality event affecting the first power source, switching, with the controller, the first solid-state switch device off to disconnect the load from the first power source; calculating, with the controller, a first value corresponding to a phase angle difference between the first power source and the second power source based on the monitored voltage waveforms; selecting, with the controller, one of a first algorithm and a second algorithm for transferring the load to the second power source from the first power source based on the first value; and selectively switching, with the controller, the second solid-state switch device using the selected one of the first algorithm and the second algorithm to transfer the load to the second power source; wherein the controller is configured to select the one of the first algorithm and the second algorithm based on the calculated first value and according to a metric of the load transfer associated with the first algorithm and the second algorithm.

Aspect 2. The method according to aspect 1, further comprising: calculating, with the controller, a second value corresponding to a starting angle for transferring the load to the second power source from the first power source; wherein the controller is configured to select the one of the first algorithm and the second algorithm based on the calculated first value and the calculated second value and according to the metric of the load transfer associated with the first algorithm and the second algorithm; wherein the metric comprises the one of the first algorithm and the second algorithm having a lowest transfer time for transferring the load to the second power source relative the other of the first algorithm and the second algorithm based on the calculated first value and the calculated second value.

Aspect 3. The method according to any of the preceding aspects, wherein selectively switching the second solid-state switch device using the first algorithm comprises: calculating, with the controller, a third value corresponding to a flux at a load transformer; and in response to the flux at the load transformer matching a flux at the second solid-state switch device, switching, with the controller, the second solid-state switch device on to transfer the load to the second power source; wherein the third value is based on a flux of the first power source when the first solid-state switch device is switched off to disconnect the load from the first power source.

Aspect 4. The method according to any of the preceding aspects, wherein selectively switching the second solid-state switch device using the second algorithm comprises: monitoring, with the controller, an electric current at the second solid-state switch device; calculating, with the controller, a current limiting range for selectively switching the second solid-state switch device using the second algorithm based on the electric current at the second solid-state switch device; and selectively switching, with the controller, the second solid-state switch device on and off to transfer the load to the second power source according to the current limiting range; wherein the current limiting range comprises an upper limit value and a lower limit value relative to a nominal current of the second solid-state switch device, and wherein the current limiting range is configured to maintain the electric current at the second solid-state switch device below an inrush current threshold.

Aspect 5. The method according to aspect 4, wherein selectively switching the second solid-state switch device on and off to transfer the load to the second power source according to the current limiting range comprises: in response to the monitored electric current falling under the lower limit value, switching, with the controller, the second solid-state switch device on and connecting the load to the second power source; and in response to the monitored electric current exceeding the upper limit value, switching, with the controller, the second solid-state switch device off and disconnecting the load to the second power source; wherein the controller is configured to selectively switch the second solid-state switch device on and off to maintain the electric current at a defined trajectory to reduce a total harmonic distortion when transferring the load to the second power source.

Aspect 6. The method according to aspects 4 or 5, further comprising: monitoring, with the controller, a time period for transferring the load from the first power source to the second power source using the second solid-state switch device; and in response to the time period exceeding a time limit, switching, with the controller, the second solid-state switch device off to disconnect the load from the second power source; wherein exceeding the time limit for transferring the load from the first power source to the second power source is indicative of a downstream fault.

Aspect 7. The method according to aspect 6, wherein the time limit may be based on a capacity of energy storage devices at the load, the energy storage devices configured to maintain a continuous supply of power to the load during the transfer.

Aspect 8. The method according to any of the preceding aspects, wherein the AC distribution system comprises at least one phase, and wherein the static transfer switch is configured to connect the load to the one of the first power source and the second power source on the at least one phase using one of the first algorithm or the second algorithm.

Aspect 9. The method according to aspect 8, wherein, in response to selecting the first algorithm, the controller is configured to switch on the second solid-state switch device at the at least one phase to transfer the load to the second power source at an instant a flux at a load transformer matches a flux at the second power source; wherein, in response to selecting the second algorithm, the controller is configured to selectively switch on and off the second solid-state switch device at the at least one phase according to a current limiting range until the flux at the load transformer matches the flux at the second power source to transfer the load to the second power source.

Aspect 10. The method according to aspects 8 or 9, wherein the AC distribution system comprises a plurality of phases, and wherein the static transfer switch is configured to connect the load to the one of the first power source and the second power source on each of the plurality of phases.

Aspect 11. The method according to any of the preceding aspects, wherein the metric comprises at least one of: a transfer time of the first algorithm and the second algorithm; a harmonic distortion during the transfer using the first algorithm and the second algorithm; or a minimum number of switching actions during the transfer using the first algorithm and the second algorithm.

Aspect 12. A system comprising: a static transfer switch, at least one phase of the static transfer switch comprising: a first solid-state switch device selectively operable to connect a load to a first power source; a second solid-state switch device selectively operable to connect the load to a second power source; and a control circuit associated with the static transfer switch, the control circuit configured to perform operations comprising: monitor a first voltage waveform of the first power source and a second voltage waveform of the second power source; in response to detecting a power quality event affecting the first power source, switch the first solid-state switch device off to disconnect the load from the first power source; calculate a first value corresponding to a phase angle difference between the first power source and the second power source based on the monitored voltage waveforms; calculate a second value corresponding to a starting angle for transferring the load to the second power source from the first power source; select one of a first algorithm and a second algorithm for transferring the load to the second power source from the first power source based on the first value and the second value; and selectively switch the second solid-state switch device using the selected one of the first algorithm and the second algorithm to transfer the load to the second power source; wherein the control circuit is configured to select the one of the first algorithm and the second algorithm based on the first value and the second value and according to a metric of the load transfer associated with the first algorithm and the second algorithm.

Aspect 13. The system according to aspect 12, wherein selectively switching the second solid-state switch device using the first algorithm comprises: calculate a third value corresponding to a flux at a load transformer; and in response to the flux at the load transformer matching a flux at the second solid-state switch device, switching, with the control circuit, the second solid-state switch device on to transfer the load to the second power source; wherein the third value is based on a flux of the first power source when the first solid-state switch device is switched off to disconnect the load from the first power source.

Aspect 14. The system according to aspects 12 or 13, wherein selectively switching the second solid-state switch device using the second algorithm comprises: monitor an electric current at the second solid-state switch device; calculate a current limiting range for the second solid-state switch device based on the electric current at the second solid-state switch device; in response to the electric current at the second solid-state switch device exceeding a lower limit value of the current limiting range, switch the second solid-state switch device on; and in response to the electric current at the second solid-state switch device exceeding an upper limit value of the current limiting range, switch the second solid-state switch device off; wherein the current limiting range comprises the upper limit value and the lower limit value relative a nominal current of the second solid-state switch device, and wherein the current limiting range is configured to maintain the electric current at the second solid-state switch device below an inrush current threshold.

Aspect 15. The system according to aspects 12, 13, or 14, wherein the control circuit is configured to selectively switch the second solid-state switch device on and off to maintain the electric current at a defined trajectory to reduce a total harmonic distortion when transferring the load to the second power source.

Aspect 16. The system according to aspects 12, 13, 14, or 15, further comprising: monitor a time period for transferring the load from the first power source to the second power source using the second solid-state switch device based on the second algorithm; and in response to the time period exceeding a time limit, switching, with the controller, the second solid-state switch device off to disconnect the load from the second power source; wherein exceeding the time limit for transferring the load from the first power source to the second power source is indicative of a downstream fault.

Aspect 17. The system according to aspect 16, wherein the time limit is based on a capacity of energy storage devices connected to the load, the energy storage devices configured to maintain a continuous supply of power to the load during the transfer.

Aspect 18. The system according to aspects 12, 13, 14, 15, 16, or 17, wherein, in response to selecting the first algorithm, the controller is configured to switch on the second solid-state switch device to transfer the load to the second power source at an instant a flux at a load transformer matches a flux at the second power source; wherein, in response to selecting the second algorithm, the controller is configured to selectively switch on and off the second solid-state switch device according to a current limiting range until the flux at the load transformer matches the flux at the second power source to transfer the load to the second power source.

Aspect 19. The system according to aspects 12, 13, 14, 15, 16, 17, or 18, wherein the system is an AC distribution system comprising at least one phase, and wherein the static transfer switch is configured to connect the load to the one of the first power source and the second power source on the at least one phase.

Aspect 20. The system according to aspects 12, 13, 14, 15, 16, 17, 18, or 19, wherein the metric comprises at least one of: a transfer time of the first algorithm and the second algorithm; a harmonic distortion during the transfer using the first algorithm and the second algorithm; or a minimum number of switching actions during the transfer using the first algorithm and the second algorithm.

It is to be understood that changes can be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method comprising:

monitoring, with a controller associated with a static transfer switch of an AC distribution system, a first voltage waveform of a first power source connectable to a load by a first solid-state switch device of the static transfer switch and a second voltage waveform of a second power source connectable to the load by a second solid-state switch device of the static transfer switch;

in response to detecting a power quality event affecting the first power source, switching, with the controller, the first solid-state switch device off to disconnect the load from the first power source;

calculating, with the controller, a first value corresponding to a phase angle difference between the first power source and the second power source based on the monitored voltage waveforms;

selecting, with the controller, one of a first algorithm and a second algorithm for transferring the load to the second power source from the first power source based on the first value; and selectively switching, with the controller, the second solid-state switch device using the selected one of the first algorithm and the second algorithm to transfer the load to the second power source;

wherein the controller is configured to select the one of the first algorithm and the second algorithm based on the calculated first value and according to a metric of the load transfer associated with the first algorithm and the second algorithm.

2. The method of claim 1, further comprising:

calculating, with the controller, a second value corresponding to a starting angle for transferring the load to the second power source from the first power source;

wherein the controller is configured to select the one of the first algorithm and the second algorithm based on the calculated first value and the calculated second value and according to the metric of the load transfer associated with the first algorithm and the second algorithm;

wherein the metric comprises the one of the first algorithm and the second algorithm having a lowest transfer time for transferring the load to the second power source relative the other of the first algorithm and the second algorithm based on the calculated first value and the calculated second value.

3. The method of claim 2, wherein selectively switching the second solid-state switch device using the first algorithm comprises:

calculating, with the controller, a third value corresponding to a flux at a load transformer; and in response to the flux at the load transformer matching a flux at the second solid-state switch device, switching, with the controller, the second solid-state switch device on to transfer the load to the second power source;

wherein the third value is based on a flux of the first power source when the first solid-state switch device is switched off to disconnect the load from the first power source.

4. The method of claim 2, wherein selectively switching the second solid-state switch device using the second algorithm comprises:

monitoring, with the controller, an electric current at the second solid-state switch device;

calculating, with the controller, a current limiting range for selectively switching the second solid-state switch device using the second algorithm based on the electric current at the second solid-state switch device; and selectively switching, with the controller, the second solid-state switch device on and off to transfer the load to the second power source according to the current limiting range;

wherein the current limiting range comprises an upper limit value and a lower limit value relative to a nominal current of the second solid-state switch device, and wherein the current limiting range is configured to maintain the electric current at the second solid-state switch device below an inrush current threshold.

5. The method of claim 4, wherein selectively switching the second solid-state switch device on and off to transfer the load to the second power source according to the current limiting range comprises:

in response to the monitored electric current falling under the lower limit value, switching, with the controller, the second solid-state switch device on and connecting the load to the second power source; and in response to the monitored electric current exceeding the upper limit value, switching, with the controller, the second solid-state switch device off and disconnecting the load to the second power source;

wherein the controller is configured to selectively switch the second solid-state switch device on and off to maintain the electric current at a defined trajectory to reduce a total harmonic distortion when transferring the load to the second power source.

6. The method of claim 4, further comprising:

monitoring, with the controller, a time period for transferring the load from the first power source to the second power source using the second solid-state switch device; and in response to the time period exceeding a time limit, switching, with the controller, the second solid-state switch device off to disconnect the load from the second power source;

wherein exceeding the time limit for transferring the load from the first power source to the second power source is indicative of a downstream fault.

7. The method of claim 6, wherein the time limit may be based on a capacity of energy storage devices at the load, the energy storage devices configured to maintain a continuous supply of power to the load during the transfer.

8. The method of claim 2, wherein the AC distribution system comprises at least one phase, and wherein the static transfer switch is configured to connect the load to the one of the first power source and the second power source on the at least one phase using one of the first algorithm or the second algorithm.

9. The method of claim 8, wherein, in response to selecting the first algorithm, the controller is configured to switch on the second solid-state switch device at the at least one phase to transfer the load to the second power source at an instant a flux at a load transformer matches a flux at the second power source;

wherein, in response to selecting the second algorithm, the controller is configured to selectively switch on and off the second solid-state switch device at the at least one phase according to a current limiting range until the flux at the load transformer matches the flux at the second power source to transfer the load to the second power source.

10. The method of claim 9, wherein the AC distribution system comprises a plurality of phases, and wherein the static transfer switch is configured to connect the load to the one of the first power source and the second power source on each of the plurality of phases.

11. The method of claim 1, wherein the metric comprises at least one of:

a transfer time of the first algorithm and the second algorithm;

a harmonic distortion during the transfer using the first algorithm and the second algorithm; or a minimum number of switching actions during the transfer using the first algorithm and the second algorithm.

12. A system comprising:

a static transfer switch, at least one phase of the static transfer switch comprising:

a first solid-state switch device selectively operable to connect a load to a first power source;

a second solid-state switch device selectively operable to connect the load to a second power source; and a control circuit associated with the static transfer switch, the control circuit configured to perform operations comprising:

monitor a first voltage waveform of the first power source and a second voltage waveform of the second power source;

in response to detecting a power quality event affecting the first power source, switch the first solid-state switch device off to disconnect the load from the first power source;

calculate a first value corresponding to a phase angle difference between the first power source and the second power source based on the monitored voltage waveforms;

calculate a second value corresponding to a starting angle for transferring the load to the second power source from the first power source;

select one of a first algorithm and a second algorithm for transferring the load to the second power source from the first power source based on the first value and the second value; and selectively switch the second solid-state switch device using the selected one of the first algorithm and the second algorithm to transfer the load to the second power source;

wherein the control circuit is configured to select the one of the first algorithm and the second algorithm based on the first value and the second value and according to a metric of the load transfer associated with the first algorithm and the second algorithm.

13. The system of claim 12, wherein selectively switching the second solid-state switch device using the first algorithm comprises:

calculate a third value corresponding to a flux at a load transformer; and in response to the flux at the load transformer matching a flux at the second solid-state switch device, switching, with the control circuit, the second solid-state switch device on to transfer the load to the second power source;

wherein the third value is based on a flux of the first power source when the first solid-state switch device is switched off to disconnect the load from the first power source.

14. The system of claim 12, wherein selectively switching the second solid-state switch device using the second algorithm comprises:

monitor an electric current at the second solid-state switch device;

calculate a current limiting range for the second solid-state switch device based on the electric current at the second solid-state switch device;

in response to the electric current at the second solid-state switch device exceeding a lower limit value of the current limiting range, switch the second solid-state switch device on; and in response to the electric current at the second solid-state switch device exceeding an upper limit value of the current limiting range, switch the second solid-state switch device off;

wherein the current limiting range comprises the upper limit value and the lower limit value relative a nominal current of the second solid-state switch device, and wherein the current limiting range is configured to maintain the electric current at the second solid-state switch device below an inrush current threshold.

15. The system of claim 14, wherein the control circuit is configured to selectively switch the second solid-state switch device on and off to maintain the electric current at a defined trajectory to reduce a total harmonic distortion when transferring the load to the second power source.

16. The system of claim 14, further comprising:

monitor a time period for transferring the load from the first power source to the second power source using the second solid-state switch device based on the second algorithm; and in response to the time period exceeding a time limit, switching, with the controller, the second solid-state switch device off to disconnect the load from the second power source;

wherein exceeding the time limit for transferring the load from the first power source to the second power source is indicative of a downstream fault.

17. The system of claim 16, wherein the time limit is based on a capacity of energy storage devices connected to the load, the energy storage devices configured to maintain a continuous supply of power to the load during the transfer.

18. The system of claim 12, wherein, in response to selecting the first algorithm, the controller is configured to switch on the second solid-state switch device to transfer the load to the second power source at an instant a flux at a load transformer matches a flux at the second power source;

wherein, in response to selecting the second algorithm, the controller is configured to selectively switch on and off the second solid-state switch device according to a current limiting range until the flux at the load transformer matches the flux at the second power source to transfer the load to the second power source.

19. The system of claim 12, wherein the system is an AC distribution system comprising at least one phase, and wherein the static transfer switch is configured to connect the load to the one of the first power source and the second power source on the at least one phase.

20. The system of claim 12, wherein the metric comprises at least one of:

a transfer time of the first algorithm and the second algorithm;

a harmonic distortion during the transfer using the first algorithm and the second algorithm; or a minimum number of switching actions during the transfer using the first algorithm and the second algorithm.

* * * * *